United States Patent
Wade et al.

(10) Patent No.: US 11,848,549 B2
(45) Date of Patent: Dec. 19, 2023

(54) JUNCTION BOX WITH FLASHING FOR A TILE SURFACE

(71) Applicant: Easy Solar Products, LLC, Holladay, UT (US)

(72) Inventors: Benjamin Wade, Holladay, UT (US); Lee Hatley, Arvada, CO (US)

(73) Assignee: Easy Solar Products, Inc., Holladay, UT (US)

( * ) Notice: Subject to any disclaimer, the term of this patent is extended or adjusted under 35 U.S.C. 154(b) by 138 days.

(21) Appl. No.: 17/475,364

(22) Filed: Sep. 15, 2021

(65) Prior Publication Data

US 2022/0085585 A1 Mar. 17, 2022

Related U.S. Application Data

(60) Provisional application No. 63/078,368, filed on Sep. 15, 2020.

(51) Int. Cl.
*H02G 3/12* (2006.01)
*H02G 3/08* (2006.01)

(52) U.S. Cl.
CPC ............... *H02G 3/12* (2013.01); *H02G 3/088* (2013.01)

(58) Field of Classification Search
CPC .................................. H02G 3/12; H02G 3/088
USPC ........................................................ 361/641
See application file for complete search history.

(56) References Cited

U.S. PATENT DOCUMENTS

| | | | |
|---|---|---|---|
| 3,910,448 A | 10/1975 | Evans et al. | |
| 4,115,779 A * | 9/1978 | Dantzler | H01Q 1/1214 343/882 |
| 4,733,015 A * | 3/1988 | Barnes | H02G 3/088 174/666 |
| 5,661,264 A | 8/1997 | Reiker | |
| 6,023,247 A | 2/2000 | Rodeffer | |
| 6,271,467 B1 | 8/2001 | Book et al. | |
| 6,526,701 B2 | 3/2003 | Stearns et al. | |
| 6,942,189 B2 * | 9/2005 | Capozzi | H01Q 1/02 248/185.1 |
| 7,109,415 B2 | 9/2006 | Neitzel et al. | |
| 7,154,040 B1 | 12/2006 | Tompkins | |
| 7,353,961 B2 | 4/2008 | Hull et al. | |
| 7,626,118 B1 * | 12/2009 | Capozzi | H02G 3/088 174/64 |
| 8,479,455 B2 * | 7/2013 | Schaefer | H02G 3/088 52/220.8 |

(Continued)

*Primary Examiner* — Timothy J Thompson
*Assistant Examiner* — Michael F McAllister
(74) *Attorney, Agent, or Firm* — Kunzler Bean & Adamson; Bruce R. Needham

(57) ABSTRACT

A junction box may include a housing box. The housing box may be configured to selectively attach to a sub-tile surface of the structure. The housing box may include a recess portion configured to be physically positioned between a plane of a tile surface of the structure and the sub-tile surface. The housing box may also include an expose portion configured to extend away from the plane of the tile surface. In addition, the housing box may include a bottom portion attached to the recess portion. The bottom portion may include a first surface configured to be physically positioned proximate the sub-tile surface such that a central plane of the housing box is not parallel to a plane of the sub-tile surface when the plane of the tile surface is not parallel to the plane of the sub-tile surface.

20 Claims, 18 Drawing Sheets

(56) References Cited

U.S. PATENT DOCUMENTS 9,496,697 B1 * 11/2016 Wentworth ............ H02G 3/088
9,819,166 B1 * 11/2017 Capozzi .................... H02G 3/14
9,935,356 B2 * 4/2018 Wentworth .......... H01Q 1/1221

* cited by examiner

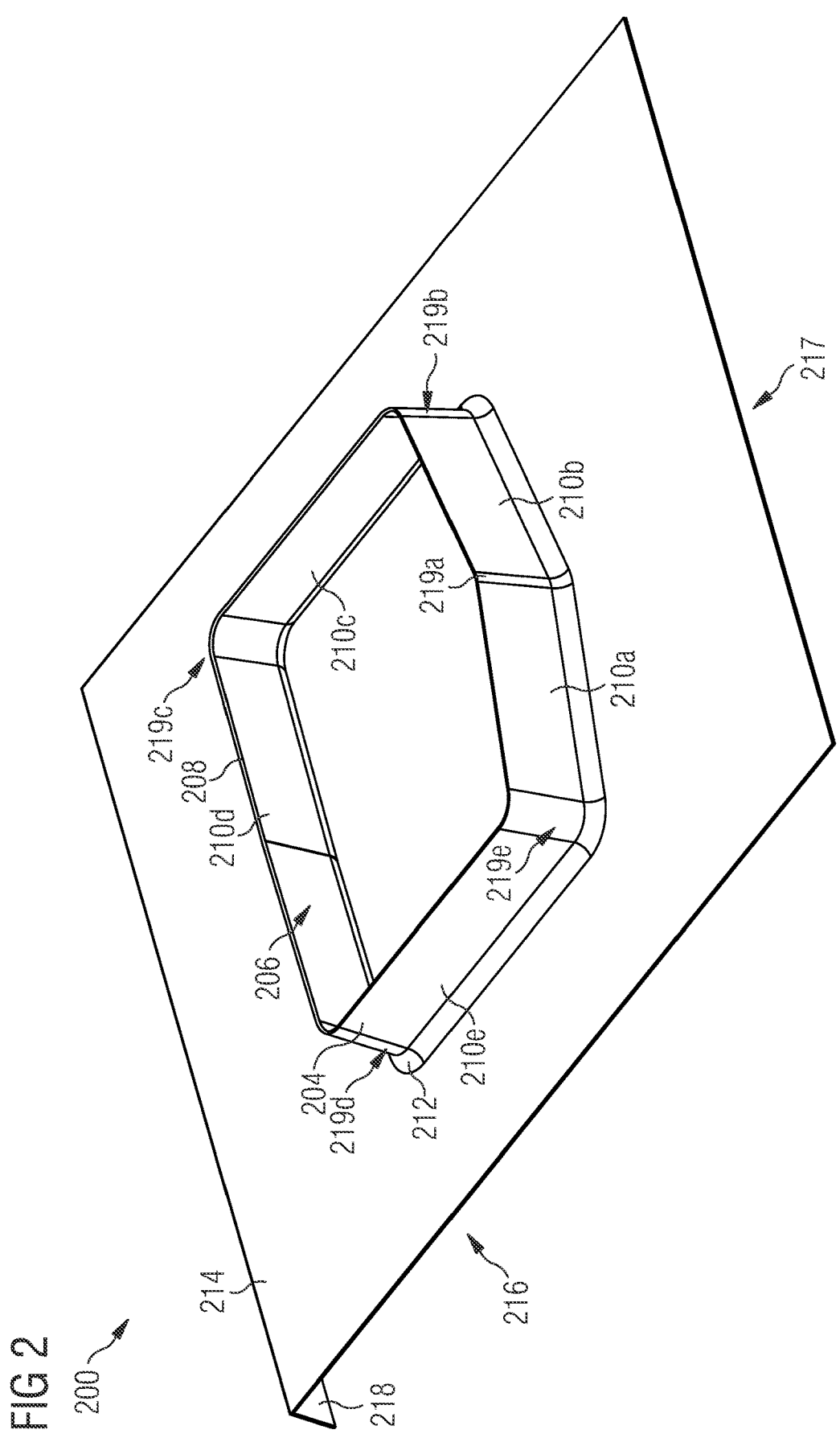

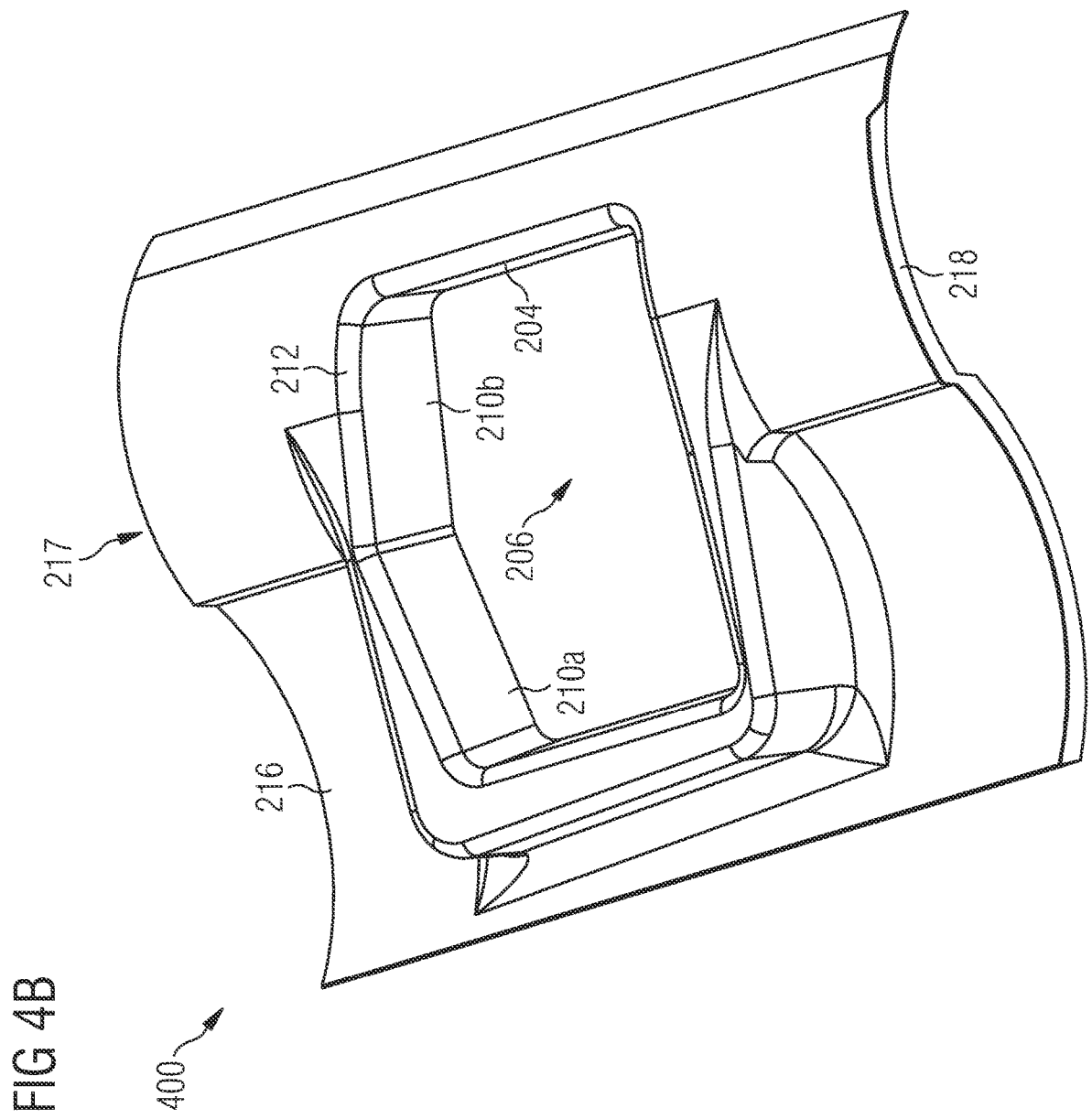

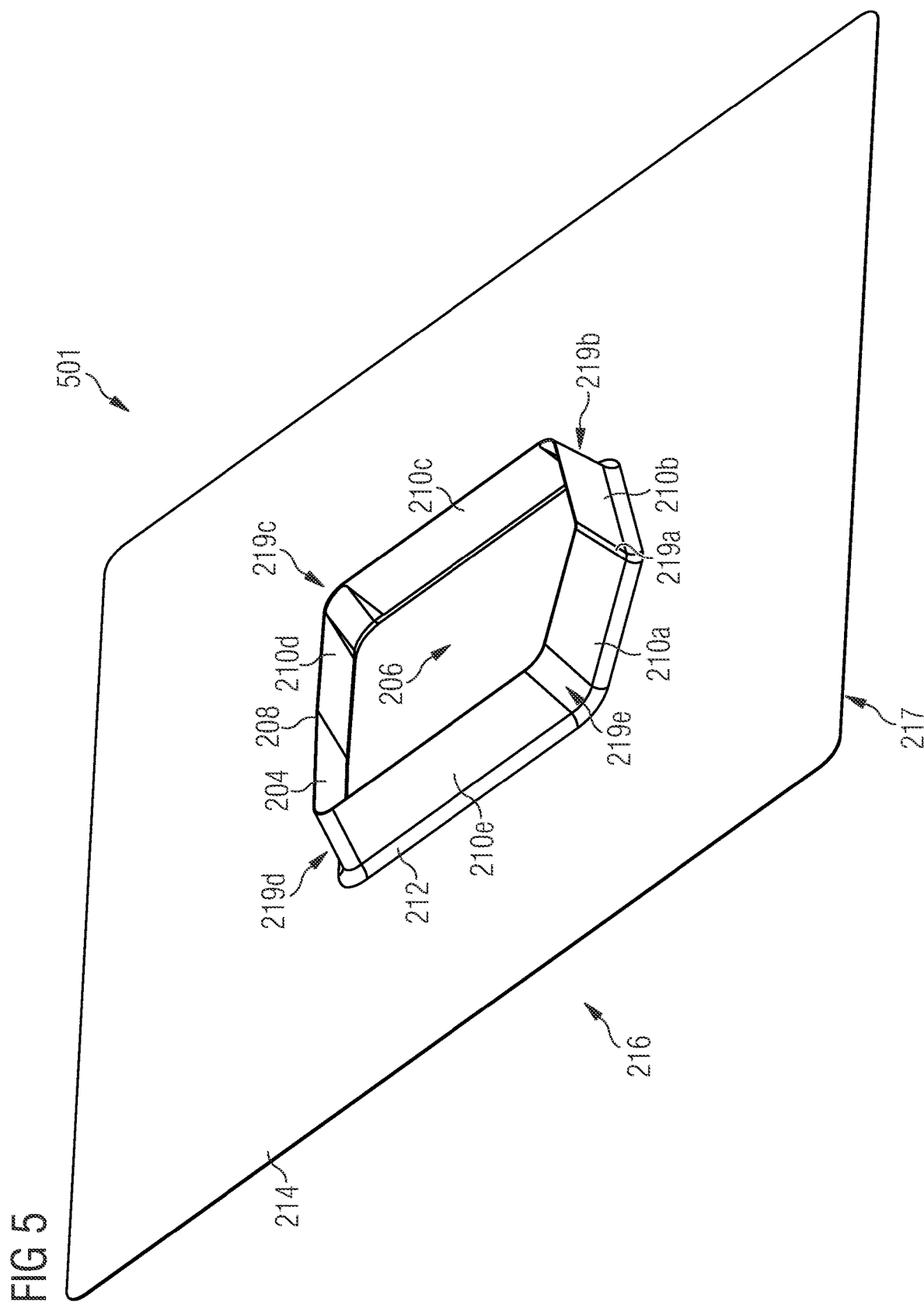

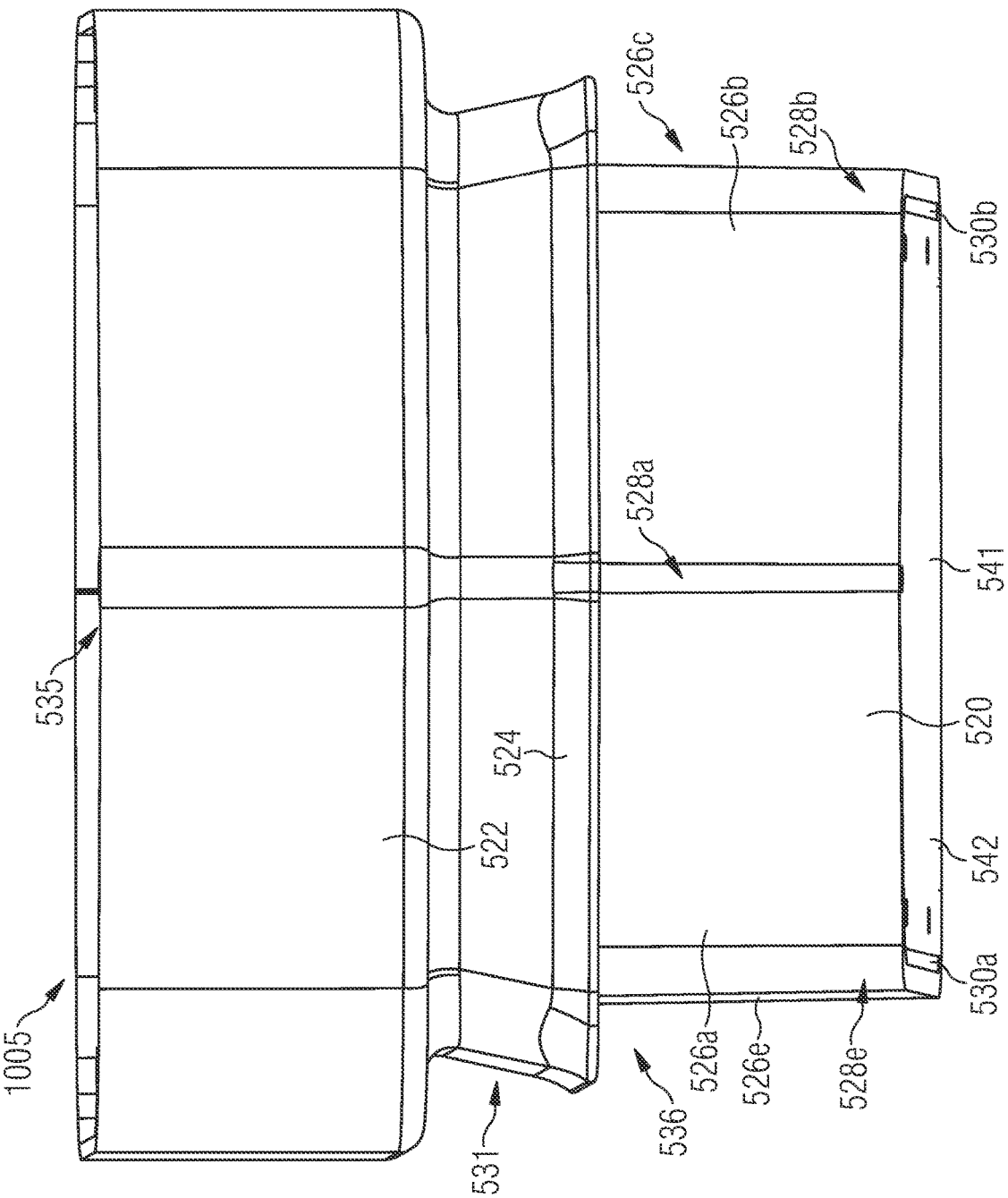

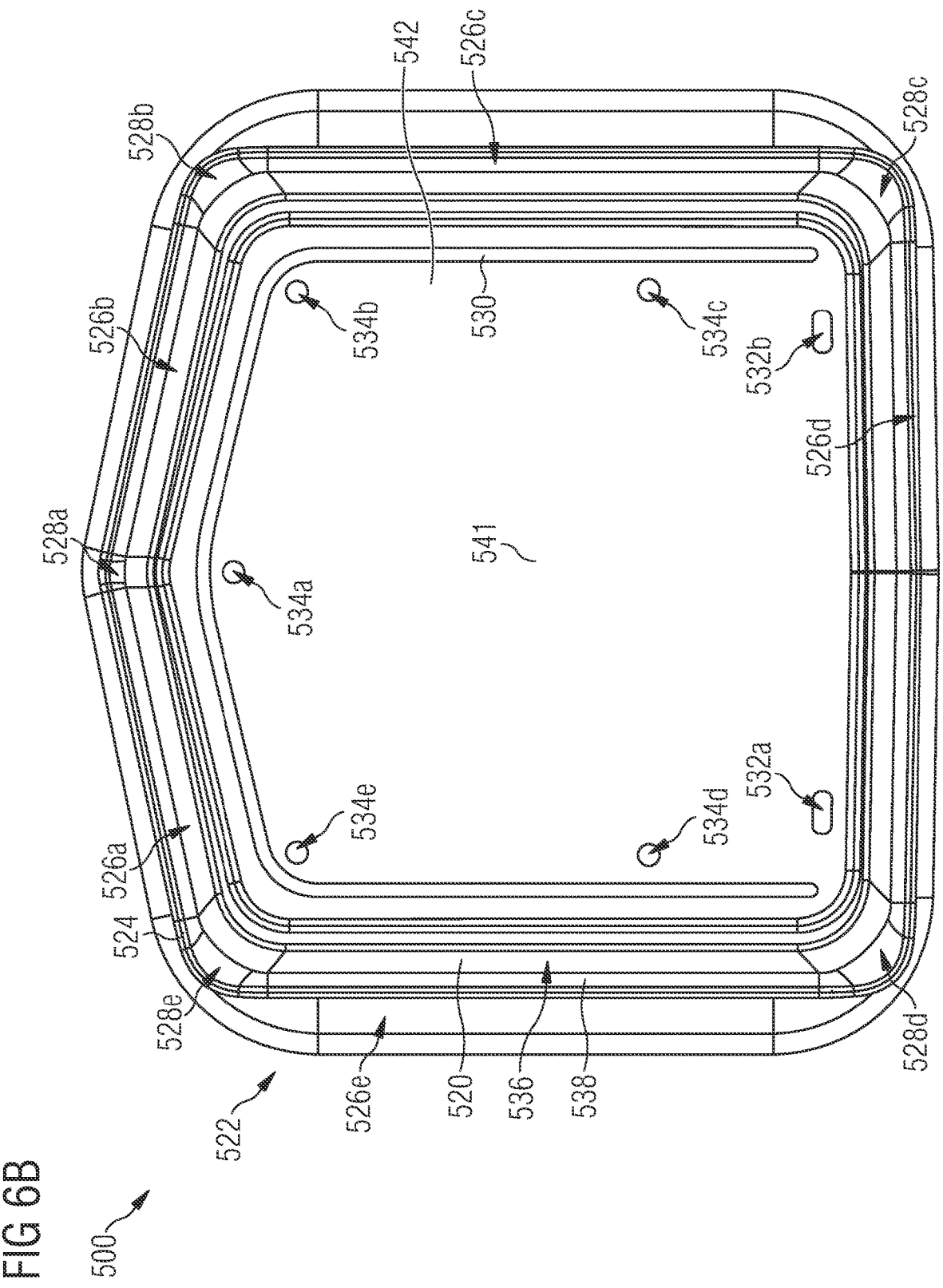

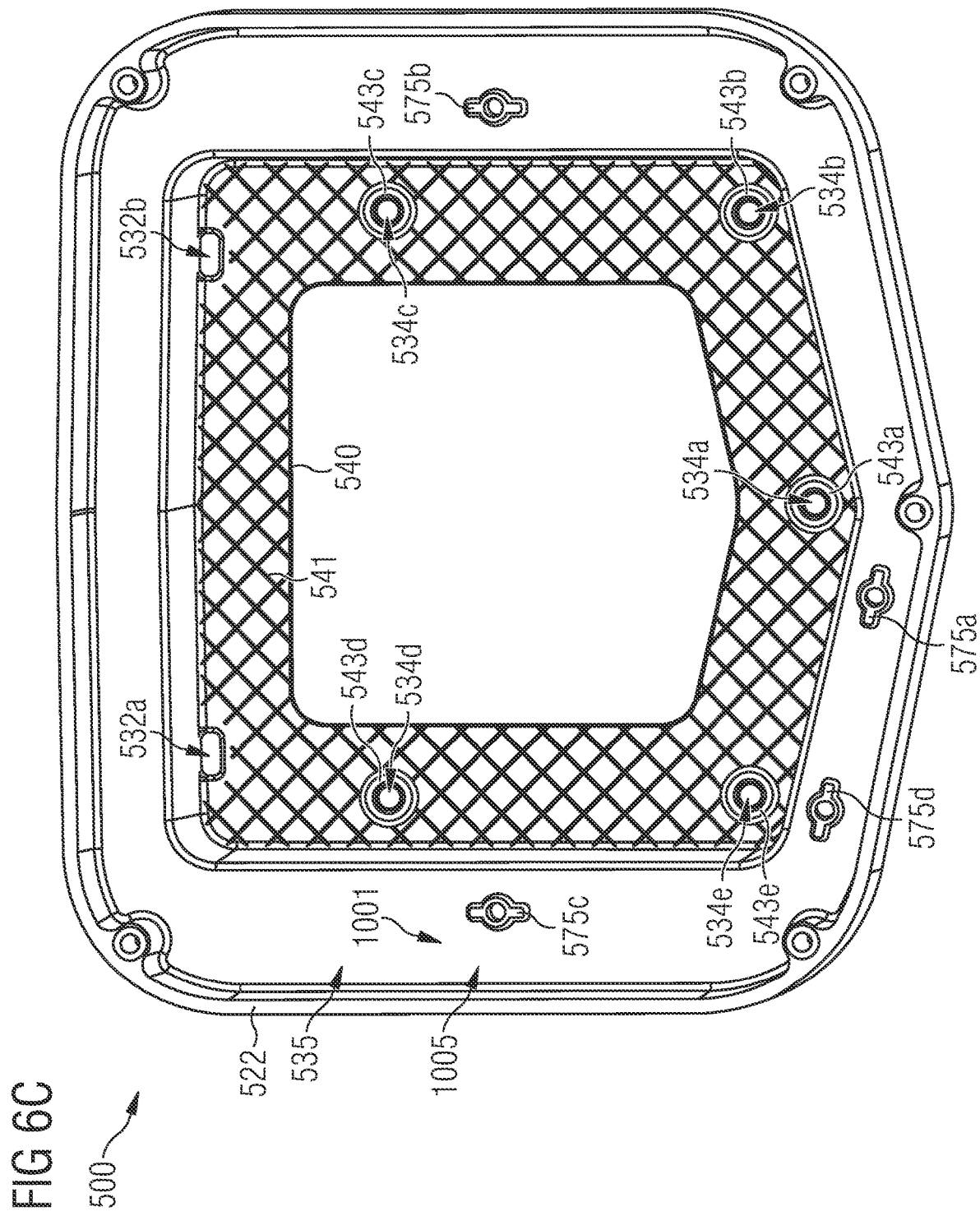

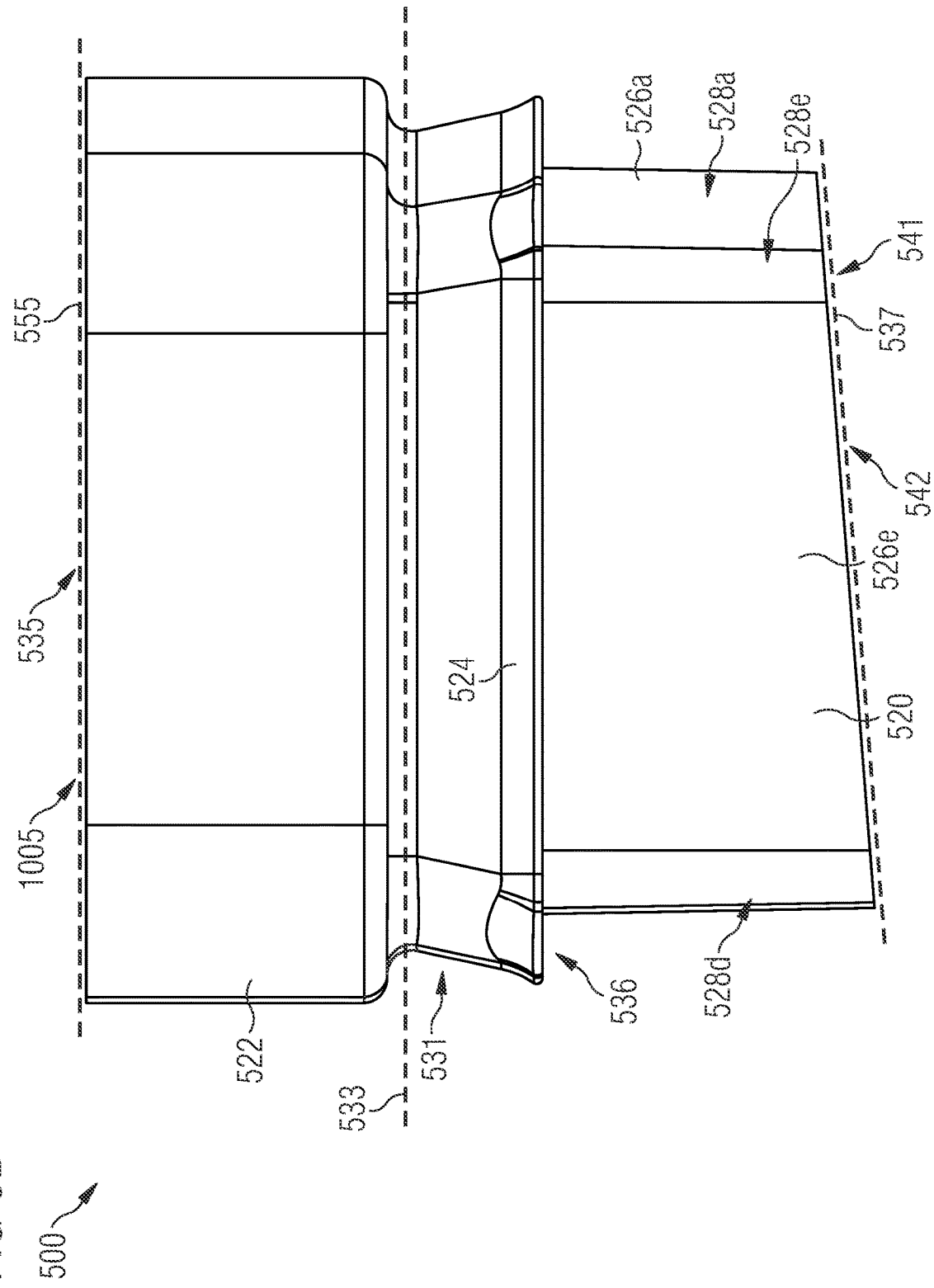

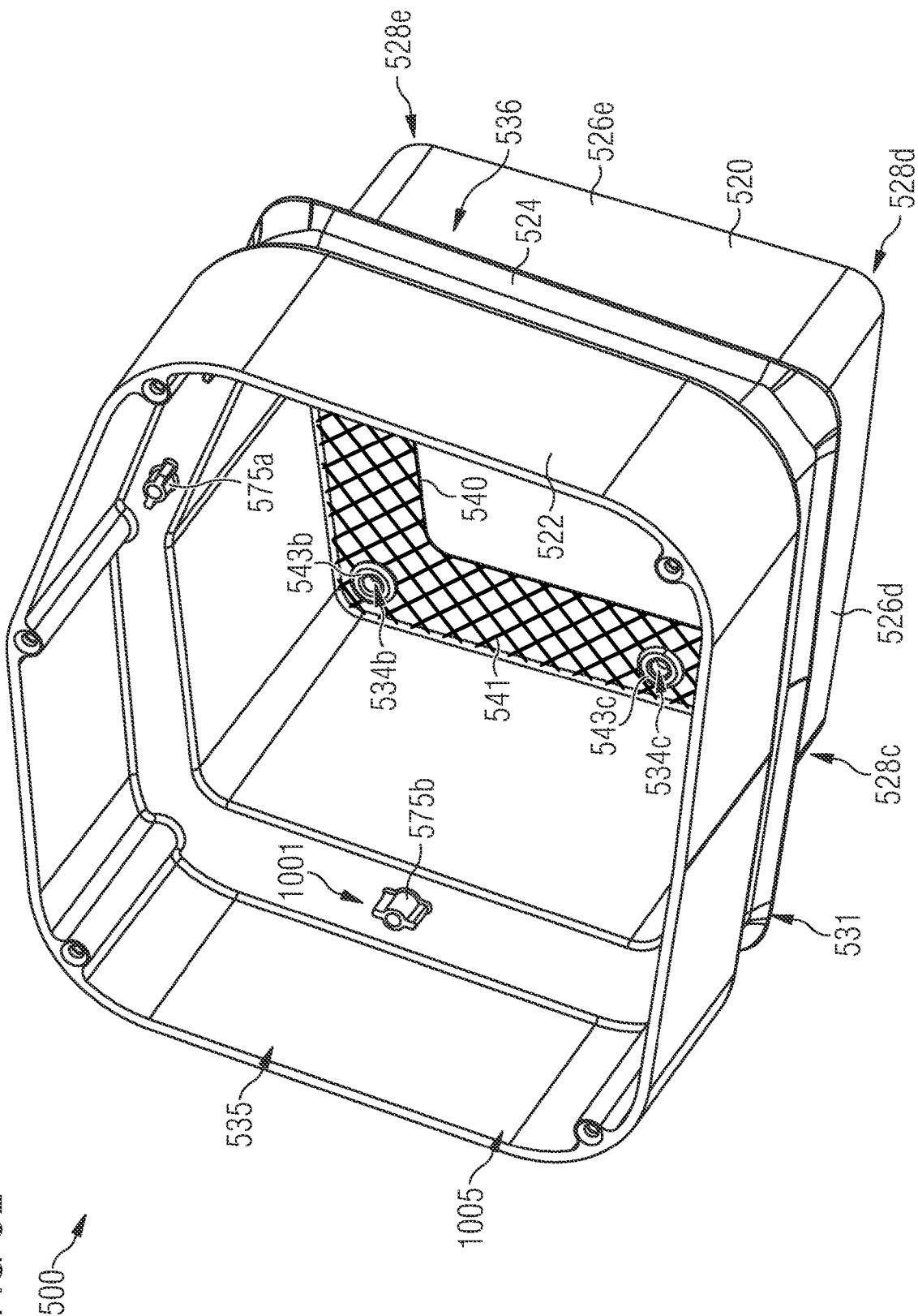

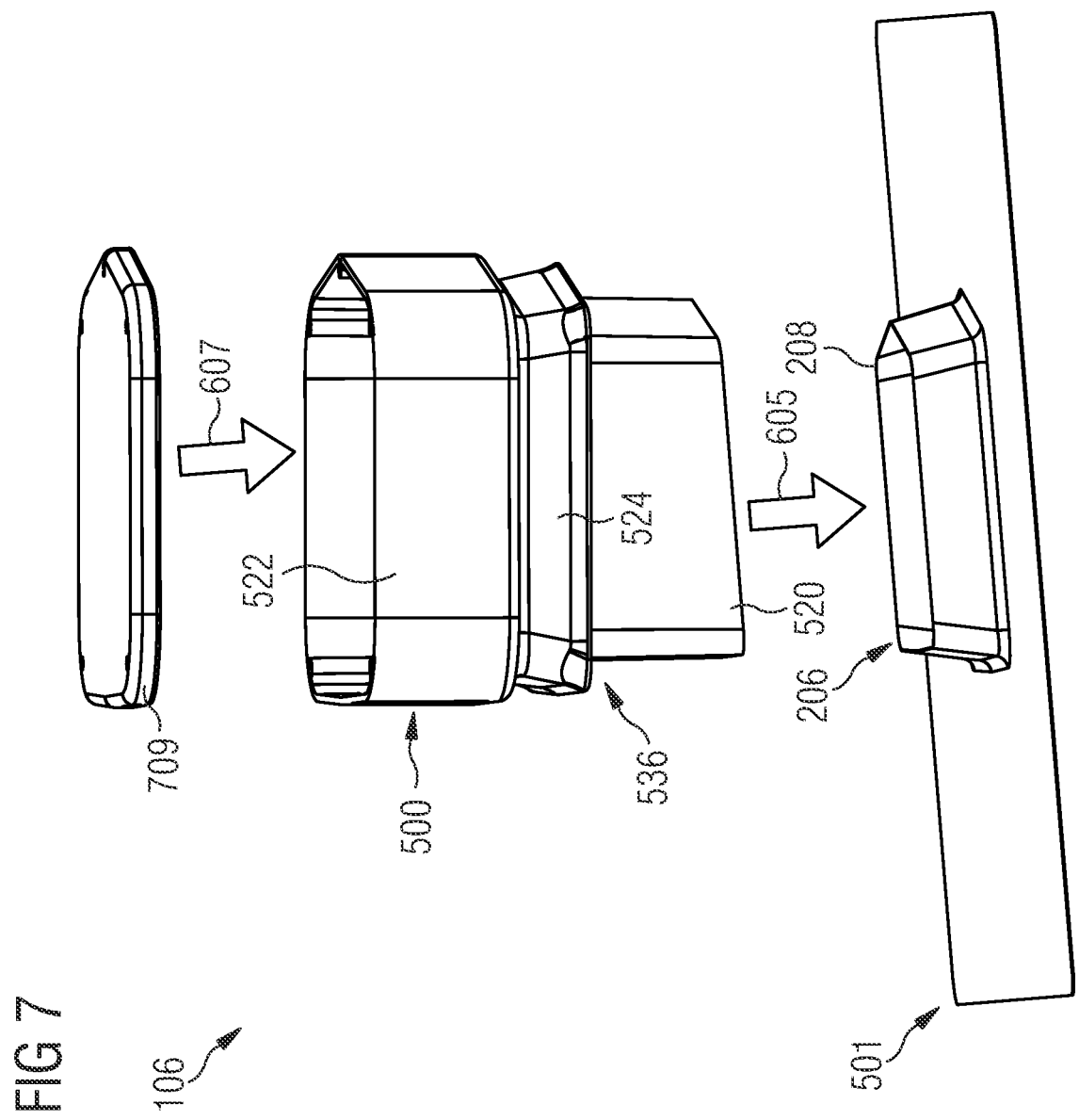

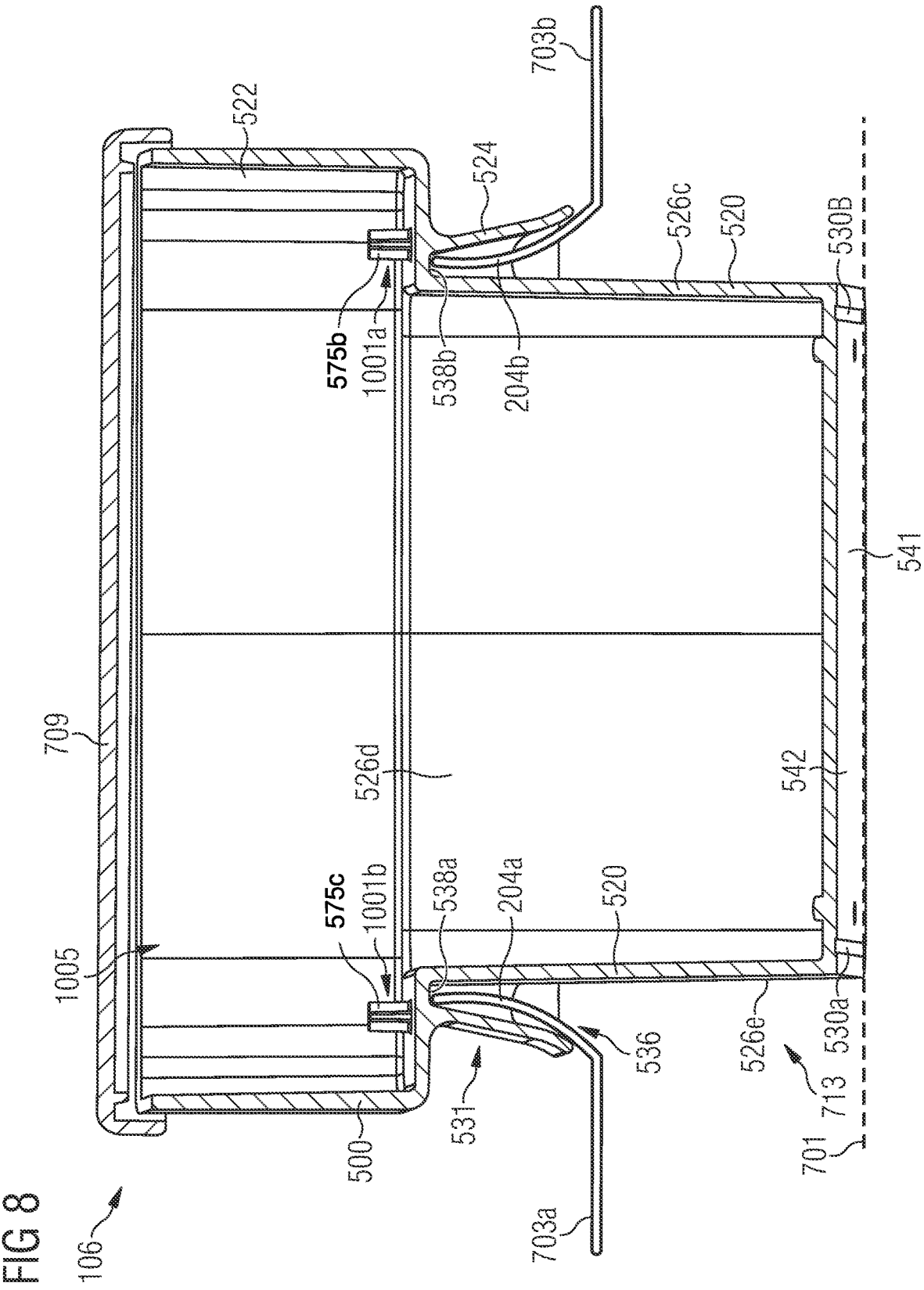

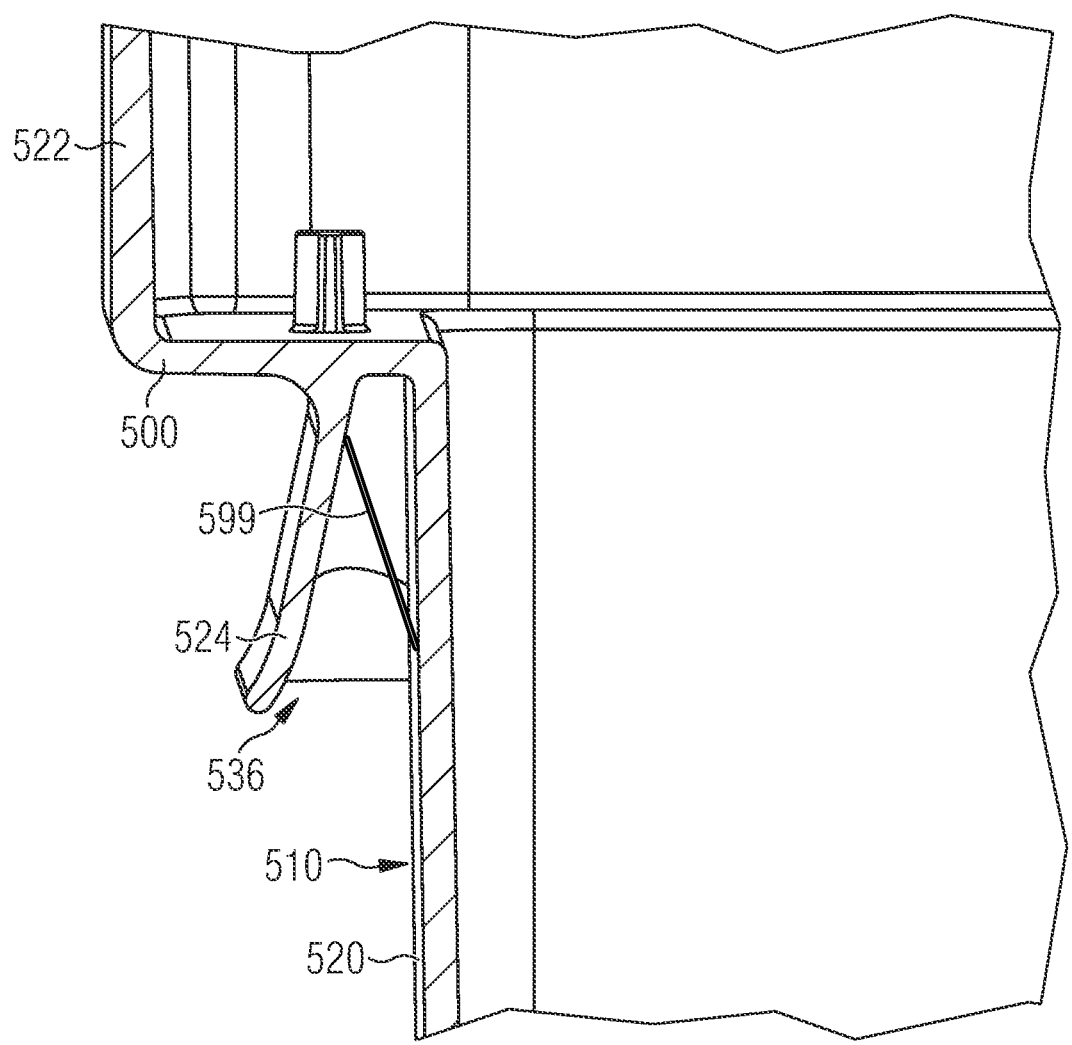

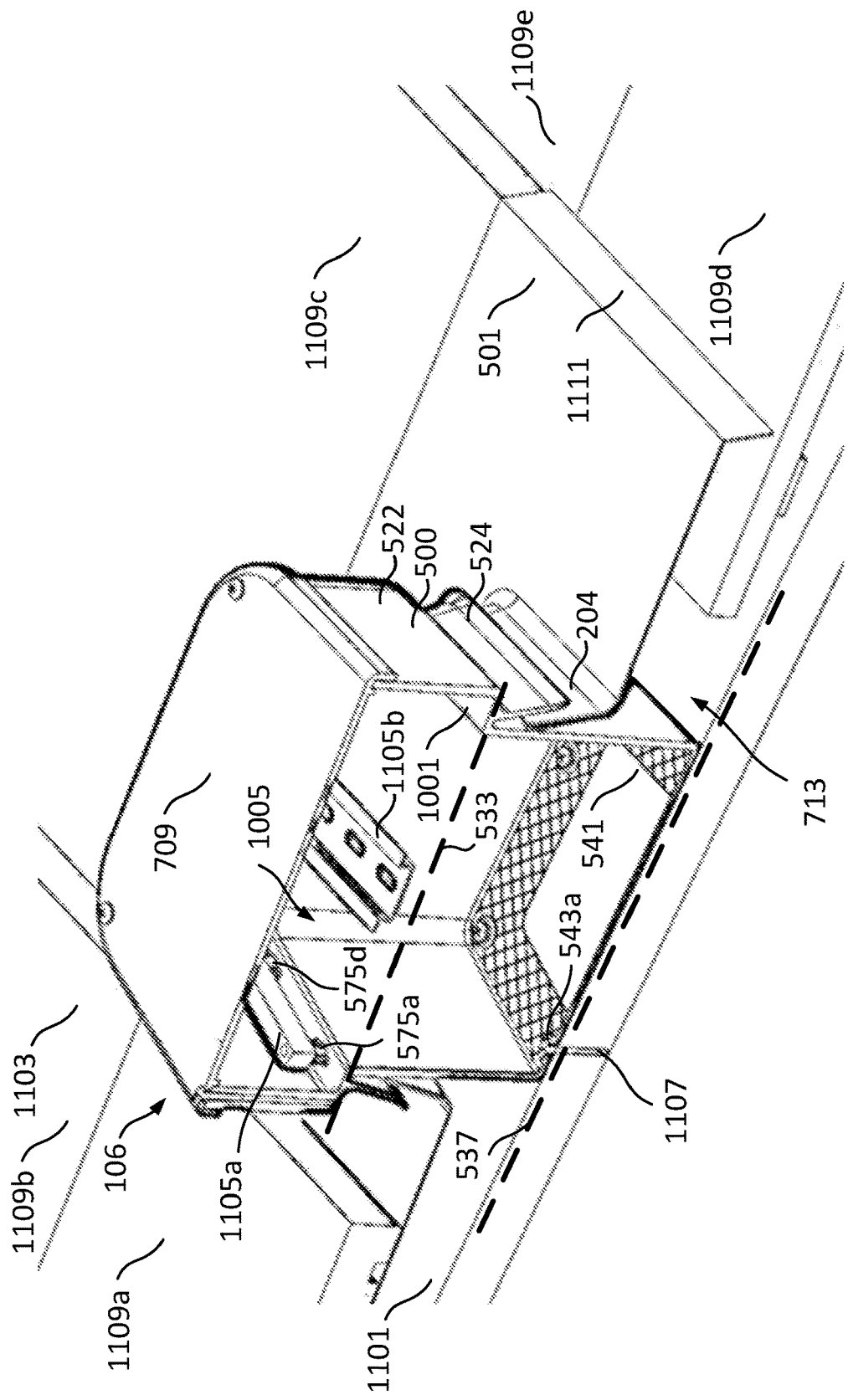

JUNCTION BOX WITH FLASHING FOR A TILE SURFACE

CROSS-REFERENCE TO RELATED APPLICATIONS

This patent application claims the benefit of and priority to U.S. Provisional App. No. 63/078,368 filed Sep. 15, 2020 titled "JUNCTION BOX," which is incorporated in the present disclosure by reference in its entirety.

FIELD

The embodiments discussed in the present disclosure are related to junction boxes.

BACKGROUND

A junction box may be used to receive, route, and connect portions of a utility system. For instance, the junction box may receive electrical cables from multiple electrical components. The electrical cables may be electrically coupled to one another within an internal volume of the junction box. Such coupling may electrically couple the multiple electrical components. The junction box may be covered or otherwise closed, which may reduce environmental interaction with the electrical cables coupled therein.

A junction box may be configured for exterior or outdoor use. The exterior junction box may be used to connect and/or route cables from one or more external devices. The external junction box may be attached to an exterior surface of a structure and may be at least partially environmentally sealed.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a junction box that includes a flashing. The flashing may be configured to be physically positioned proximate a tile surface of a structure. The flashing may include a raised portion that includes a top edge. In addition, the raised portion may define an opening. The junction box may also include a housing box. The housing box may be configured to selectively attach to a sub-tile surface of the structure. The housing box may include a recess portion and an expose portion. The expose portion may include a junction lip and a bottom portion. The junction lip may be attached to the recess portion. The junction lip may include a mating surface. The junction lip and the recess portion may define a junction recess. At least a portion of the recess portion may be configured to pass through the opening until at least a portion of the top edge physically contacts the mating surface to apply a force on the flashing in a direction towards the sub-tile surface. The bottom portion may be attached to the recess portion. The bottom portion may include a first surface configured to be physically positioned proximate the sub-tile surface such that a central plane of the housing box is not parallel to a plane of the sub-tile surface.

One or more embodiments of the present disclosure may include a junction box that includes a housing box. The housing box may be configured to selectively attach to a sub-tile surface of the structure. The housing box may include a recess portion configured to be physically positioned between a plane of a tile surface of the structure and the sub-tile surface. The housing box may also include an expose portion configured to extend away from the plane of the tile surface. In addition, the housing box may include a bottom portion attached to the recess portion. The bottom portion may include a first surface configured to be physically positioned proximate the sub-tile surface such that a central plane of the housing box is not parallel to a plane of the sub-tile surface when the plane of the tile surface is not parallel to the plane of the sub-tile surface.

One or more embodiments of the present disclosure may include a junction box. The junction box may include a flashing and a housing box. The flashing may be configured to be physically positioned proximate a tile surface of a structure. The flashing may include a raised portion that includes a top edge. The raised portion may define an opening. The housing box may be configured to selectively attach to a sub-tile surface of the structure. The housing box may include a recess portion and an expose portion. The expose portion may include a junction lip and a bottom portion. The junction lip may be attached to the recess portion and may include a mating surface. The junction lip and the recess portion may define a junction recess. At least a portion of the recess portion is configured to pass through the opening until at least a portion of the top edge physically contacts the mating surface to apply a force on the flashing in a direction towards the sub-tile surface. The bottom portion may be attached to the recess portion. The bottom portion may include a first surface configured to be physically positioned proximate the sub-tile surface such that: a central plane of the housing box may be not parallel to a plane of the sub-tile surface when a plane of the tile surface is not parallel to a plane of the sub-tile surface; and at least a portion of the bottom surface may be flush with a portion of the tile surface.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example aspects will be described and explained with additional specificity and detail through the use of the accompanying drawings in which:

FIG. 2 illustrates a perspective view of an exemplary flashing that may be implemented in the junction box of FIG. 1;

FIG. 4B illustrates another perspective view of the exemplary flashing that may be implemented in the junction box of FIG. 1;

FIG. 5 illustrates a perspective view of an exemplary flashing that may be implemented in the junction box of FIG. 1;

FIG. 6A illustrates a front view of an exemplary housing box that may be implemented in the junction box of FIG. 1;

FIG. 6B illustrates a bottom view of the exemplary housing box that may be implemented in the junction box of FIG. 1;

FIG. 6C illustrates a top view of the exemplary housing box that may be implemented in the junction box of FIG. 1;

FIG. 6D illustrates a side view of the exemplary housing box that may be implemented in the junction box of FIG. 1;

FIG. 6E illustrates a perspective view of the exemplary housing box that may be implemented in the junction box of FIG. 1;

FIG. 7 illustrates the exemplary housing box mating to the exemplary flashing of FIG. 5 and an exemplary lid to form the junction box of FIG. 1;

FIG. 8 illustrates a cross sectional view of the exemplary junction box of FIG. 1;

FIG. 9 illustrates a sectional view of the exemplary housing box including a protrusion, FIG. 11 illustrates a cross sectional view of the exemplary junction box of FIG. 1 in an installed configuration, all according to at least one embodiment described in the present disclosure.

DETAILED DESCRIPTION

Figure 1:
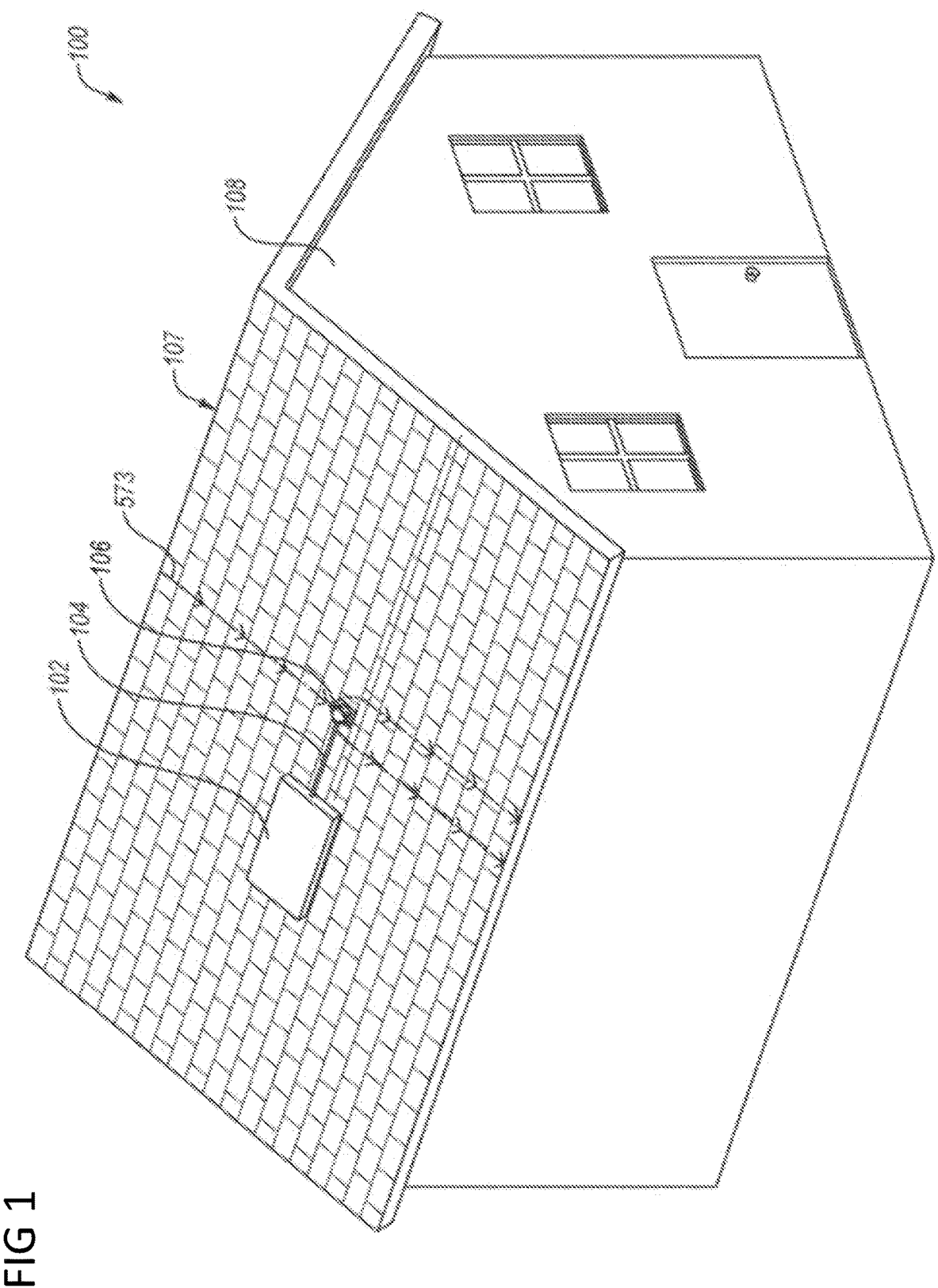
FIG. 1 illustrates an example operating environment in which a junction box may be implemented.

A junction box may be used for routing cables, wires, and/or other devices coupled to an external device located on an exterior surface of a structure (e.g., a tile surface, a concrete tile surface, a sub-tile, a sub-concrete tile surface, or any other appropriate tile surface) to an interior space of the structure. For example, the cables, wires, and/or other devices may be coupled to a solar panel or battery located on a roof of a house. Other devices may include coaxial cables, registered jack 45 ("RJ45") cables, and any other appropriate device. The sub-tile surface may include a sheathing surface of the structure. The tile surface may include a metal roof material, a corrugated roof material, a tiled roof material, a shingled roof material, a slate roof material, a concrete roof material, a cement roof material, a composite roof material, a solar roof material, a clay roof material, a wood roof material, or any other appropriate type of roof material. For example, the tile surface may include tiles, cement tiles, slate tiles, metal tiles, concrete tiles, composite tiles, solar tiles, clay tiles, wood tiles, or any other appropriate type of tile. The cables, wires, and/or other devices may be routed from the external device to electrical connections located in the interior space of the structure using the junction box.

The tiles may be attached to the sub-tile surface in rows, columns, or some combination thereof. In addition, the tiles may be placed in an overlapping configuration. For example, a portion of a tile, when installed, may be physically positioned between the sub-tile surface and a neighboring tile. Likewise, another portion of the tile, when installed, may be physically positioned such that a portion of another tile is positioned between the another portion of the tile and the sub-tile surface. At least a portion of the tiles of a row of the tiles may be attached to the sub-tile surface so as to form a substantially contiguous surface, plane, or some combination thereof (e.g., the tiles of at least a portion of the row may each include a plane that is at an angle that is the same as or similar to the plane of other tiles in the row).

Installation of the junction box on the exterior surface of the structure may be difficult and dangerous. A junction box that includes features that reduce time, a number of tools, and/or a number of pieces of equipment used to install the junction box (collectively, resources/complexity) may reduce risks and costs associated with installation of the junction box. Reductions in the resources/complexity may be achieved by using a junction box that compensates for a difference between an angle of the plane of the tile surface and an angle of a plane of the sub-tile surface.

Some embodiments described in the present disclosure may include a junction box configured to compensate for the difference between the angle of the plane of the tile surface and the angle of the plane of the sub-tile surface. During installation of the junction box, one or more tiles may be removed and the junction box may replace one of the removed tiles. The junction box may be configured such that, when installed, a first surface of a bottom portion of the junction box is physically positioned proximate the sub-tile surface. For example, the first surface may be flush with a portion of the sub-tile surface. The junction box may also be configured such that, when installed, a plane of a box opening of the junction box is substantially parallel to the plane of the tile surface and such that the flashing forms a portion of the surface, plane, or some combination thereof of the tile surface. The plane of the tile surface may correspond to the plane of the tile surface formed by the corresponding row or by all of the tiles. In addition, the junction box may be configured such that when installed, one or more surfaces of an expose portion of the junction box may be perpendicular, not parallel, or some combination thereof to the plane of the sub-tile surface to permit connectors to connect to the expose portion of the junction box.

The junction box may include the flashing and a housing box. The flashing may be configured to be physically positioned proximate the tile surface (e.g., substantially parallel to a plane of the tile surface). The flashing may include a raised portion. The raised portion may include a top edge and may define an opening. The housing box may be configured to selectively attach to the sub-tile surface. The housing box may include a recess portion and the expose portion. The expose portion may include a junction lip and a bottom portion. The junction lip may be attached to the recess portion and may include a mating surface. The junction lip and the recess portion may define a junction recess. At least a portion of the recess portion may be configured to pass through the opening until at least a portion of the top edge physically contacts the mating surface to apply a force on the flashing in a direction towards the tile surface, the tile surface, or some combination thereof. The bottom portion may be attached to the recess portion. The bottom portion may include a first surface that is configured to be physically positioned proximate the sub-tile surface such that a central plane of the housing box is not parallel to a plane of the sub-tile surface.

The junction box may permit quicker installation times compared to junction boxes that do not compensate for the difference between the angle of the plane of the tile surface and the angle of the plane of the sub-tile surface. The junction box may also be configured such that a single tile may be removed for installation of the junction box. In addition, the junction box may be configured such that connectors may be attached to one or more (e.g., three)

surfaces of the expose portion. Further, the junction box may include polymer materials that are configured to withstand exposure to ultraviolet (UV) rays and harsh temperatures (e.g., cold and hot temperatures). The flashing may include a metal material that is configured to mold or form to a surface of neighboring tiles to permit quicker installation time. The junction box may also be configured to shed moisture to prevent or reduce an amount of moisture that accesses a volume between the tiles and the sub-tile surface. In addition, the internal volume of the junction box may be configured to permit extremities of a user to access the internal volume to attach a ground/neutral bar, a din rail, or similar device rather than specialized tools, which may reduce installation complexity.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

FIG. 1 illustrates an example operating environment 100 in which a junction box 106 may be implemented, in accordance with at least one aspect described in the present disclosure. The operating environment 100 may include a structure 108 on which an external device 102 and the junction box 106 are installed. The external device 102 may be attached to a tile surface, a sub-tile surface, or some combination thereof. The junction box 106 may be installed so as to be attached to the sub-tile surface and to be physically proximate a portion of the tile surface.

The junction box 106 may provide an environmentally sealed device for routing cables, wires, and/or other devices from the external device 102 to an interior space of the structure 108. In some embodiments, the junction box 106 may provide an environmentally sealed device for housing wire nuts, grounding lugs, split bolt splicing, Polaris connectors, fuses, breakers or any other appropriate device or component for routing the cables, wires, and other devices from the external device 102 to the interior space of the structure 108. The external device 102 may be connected to the junction box 106 via a connection device 104.

The tiles of the structure may form the tile surface. The sub-tile surface may include the surface that the tiles are attached to. For example, the sub-tile surface may include wood, plastic, or any other appropriate material. The tiles may prevent or reduce an amount that the sub-tile surface is exposed to environmental elements such as moisture (e.g., snow or rain) and UV rays.

The tile surface, the sub-tile surface, or some combination thereof may include a cement surface, a cement tile surface, a tile surface, a metal tile surface, a metal surface, or another suitable exterior surface. For example, the tile surface may include a metal roof material, a corrugated roof material, a tiled roof material, a shingled roof material, a slate roof material, a concrete roof material, a cement roof material, a composite roof material, a solar roof material, a clay roof material, a wood roof material, or any other appropriate type of roof material.

In the embodiment of FIG. 1, the structure 108 includes a house. In other embodiments, the structure 108 may include another structure such as a shed, a garage, a solar array, or another suitable structure to which the external device 102 and/or the junction box 106 may be attached.

The external device 102 may include any device that includes cables, wires, and/or other devices that are to be routed from the external device 102 to an interior space of the structure 108. For example, the external device 102 may include a solar panel array, a satellite dish, or a battery system. The solar panel array may include photovoltaic wires that are to be routed through the junction box 106 into the interior space of the structure 108. In some embodiments, the cables, wires, and/or other devices may be routed through the exterior surface via the junction box 106. The cables, wires, and/or other devices may then electrically couple the external device 102 to an electrical device located in an interior space of the structure 108 or to a power grid. In some embodiments, the cables, wires, or other devices from multiple external devices (e.g., the external device 102) may be joined at the junction box 106.

Additionally, the junction box 106 may be installed so that a first edge of a flashing may be oriented towards an apex 107 of the exterior surface (e.g., a ridge line of the roof). The junction box 106 may be installed below the apex 107 relative to gravity. Additionally, the first edge of the flashing may be installed substantially parallel to the apex 107 of the structure (e.g., substantially perpendicular to the flow of the fluid 573 on the exterior surface). A first sidewall and a second sidewall (e.g., sidewalls or box sidewalls) may be positioned at angles substantially not parallel relative to the apex 107 of the exterior surface.

Figure 3A:
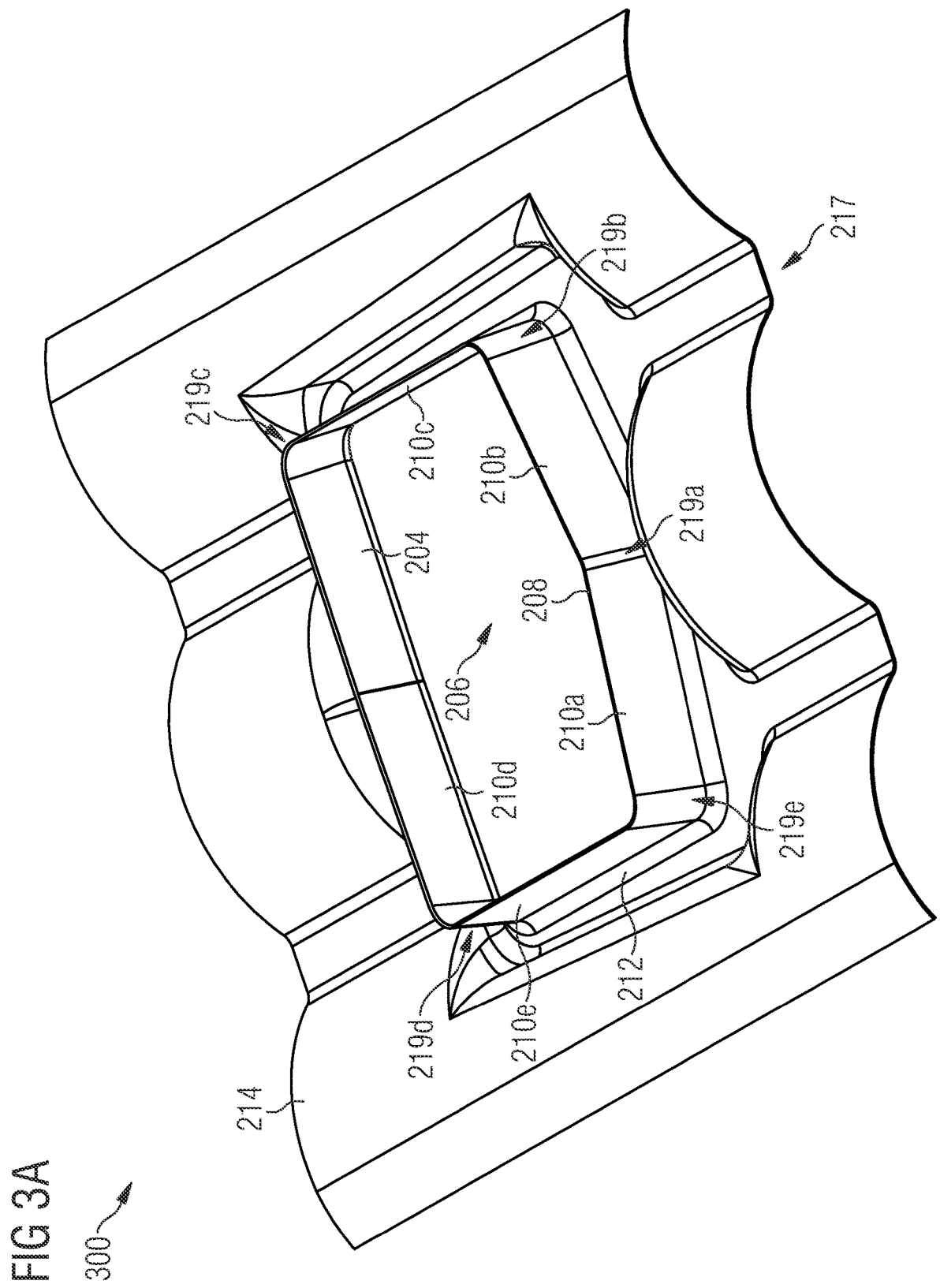
FIG. 3A illustrates a perspective view of an exemplary flashing that may be implemented in the junction box of FIG. 1.
Figure 3B:
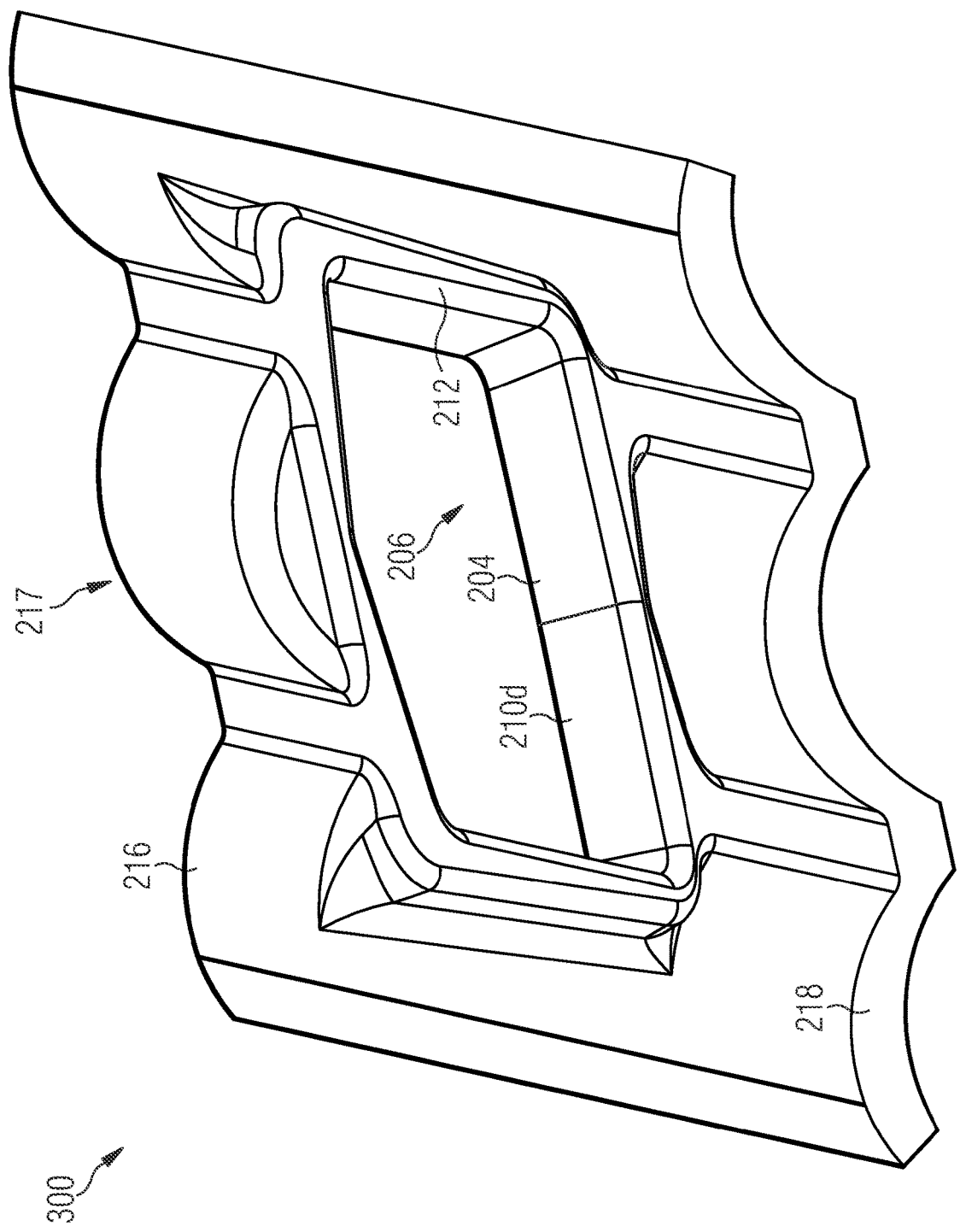
FIG. 3B illustrates another perspective view of the exemplary flashing that may be implemented in the junction box of FIG. 1.
Figure 4A:
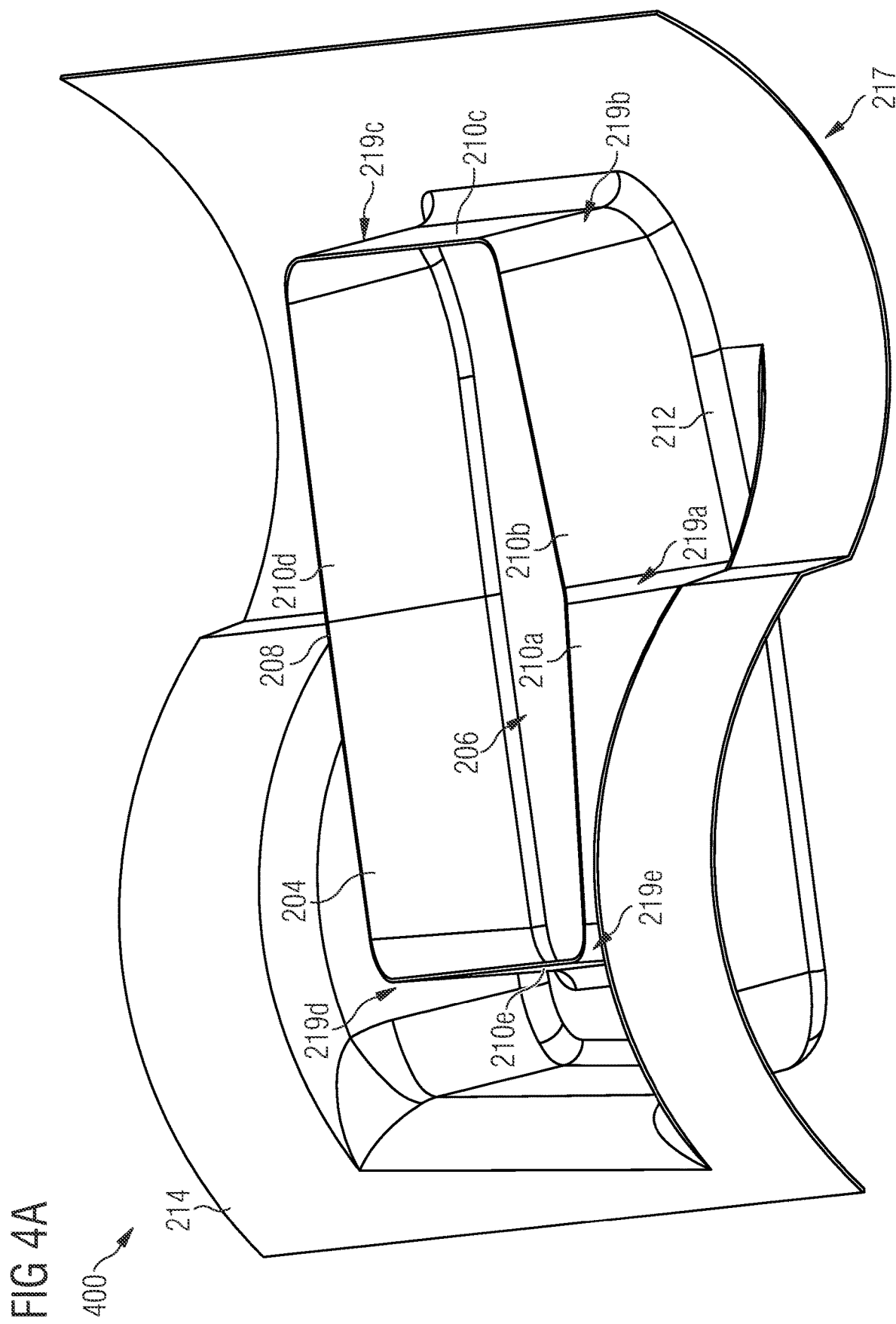
FIG. 4A illustrates a perspective view of an exemplary flashing that may be implemented in the junction box of FIG. 1.

FIG. 2 illustrates a perspective view of an exemplary flashing 200 that may be implemented in the junction box 106 of FIG. 1, in accordance with at least one aspect described in the present disclosure. FIGS. 3A and 3B illustrate perspective views of an exemplary flashing 300 that may be implemented in the junction box 106 of FIG. 1, in accordance with at least one aspect described in the present disclosure. FIGS. 4A and 4B illustrate perspective views of an exemplary flashing 400 that may be implemented in the junction box 106 of FIG. 1, in accordance with at least one aspect described in the present disclosure. FIG. 5 illustrates a perspective view of an exemplary flashing 501 that may be implemented in the junction box 106 of FIG. 1, in accordance with at least one aspect described in the present disclosure.

With combined reference to FIGS. 2-5, the flashings 200, 300, 400, 501 may be configured to be physically positioned proximate the tile surface. The flashings 200, 300, 400, 501 when installed, may form a portion of the tile surface. For example, during installation, a tile may be removed from the tile surface and the flashings 200, 300, 400, 501 may be physically positioned proximate a portion of the tile surface to replace the removed tile. The flashings 200, 300, 400, 501 may be physically positioned so as to be relatively flush with a portion of the tile surface.

The flashings 200, 300, 400, 501 may include a raised portion 204 that includes a top edge 208 and defines an opening 206. The opening 206 may be defined so as to receive a housing box (e.g., housing box 500 of FIGS. 6A-6F) or any other appropriate device. The raised portion 204 may be attached to a top surface 214, a bottom surface 216, or some combination thereof via a transition portion 212.

The raised portion 204 may include a first sidewall 210a, a second sidewall 210b, a third sidewall 210c, a fourth sidewall 210d, or a fifth sidewall 210e (generally, sidewalls 210 or sidewall 210). The first sidewall 210a and the second sidewall 210b may form a first joint 219a. the second sidewall and the third sidewall 210c may form a second joint 219b. The third sidewall 210c and the fourth sidewall 210d may form a third joint 219c. The fourth sidewall 210d and the fifth sidewall 210e may form a fourth joint 219d. The fifth sidewall 210e and the first sidewall 210a may form a fifth joint 219e. The first joint 219a, the second joint 219b, the third joint 219c, the fourth joint 219d, and the fifth joint 219e may be generally referred to as joints 219 or joint 219 in the present disclosure.

The bottom surface 216 may be configured to physically positioned proximate the portion of the tile surface. The bottom surface 216 may be physically positioned proximate the tile surface such that at least a portion of the bottom surface 216 is flush with the portion of the tile surface (e.g., such that the flashings 200, 300, 400, 501 are substantially parallel to a plane of the tile surface).

The bottom surface 216 may be configured to mate with the tile surface. For example, as illustrated in FIG. 2 and FIG. 5, the flashings 200, 501 may be formed to be substantially flat along a plane and the bottom surface 216 may be configured to mate with a substantially flat surface profile of the exterior of the structure (e.g., one or more metal tiles of a roof or tile roof). In addition, the flashings 200, 501 may include a pliable material (e.g., a moldable material) that is configured to be formed to the profile of the tile surface during installation. As another example, as illustrated in FIGS. 3A and 3B, the flashing 300 may be formed to include one or more curves and the bottom surface 216 may be configured to mate with a profile of the tile surface that includes one or more curves (e.g., one or more tiles). As yet another example, as illustrated in FIGS. 4A and 4B, the flashing 400 may be formed to include one or more different curves and the bottom surface 216 may be configured to mate with a profile of the tile surface that includes one or more different curves (e.g., one or more different types of tiles of a roof).

The flashings 200, 300, 400, 501 may include a first edge 217. The first edge 217, when installed, may be oriented towards an apex of the exterior surface. Additionally, the first edge 217, when the flashings 200, 300, 400, 501 are installed, may be substantially parallel to the apex of the structure.

The flashings 200, 300, 400 may also include a support lip 218 (illustrated in FIGS. 2, 3B, and 4B) attached to an edge of the flashings 200, 300, 400. The support lip 218 may be attached to the edge of the flashings 200, 300, 400 that is opposite the first edge 217. Alternatively, the support lip 218 may be attached to the first edge 217. The support lip 218 may be configured to at least temporarily mate with the tile surface to prevent the flashings 200, 300, 400 from moving relative the tile surface during installation, after installation, or some combination thereof. In addition, the support lip 218 may align the flashings 200, 300, 400 relative to one or more of the tiles. Further, the support lip 218 may shed fluids to prevent fluids from building up between the flashings 200, 300, 400 and the tile surface. In some embodiments, the support lip 218 may be omitted and the bottom surface 216 may form a substantially flat surface as illustrated in FIG. 5.

In some embodiments, the raised portion 204 may be attached to the top surface 214 and the bottom surface 216 to form a single unibody piece of material. For example, the flashings 200, 300, 400, 501 may be formed using mold injection techniques as single pieces of material. As another example, the flashings 200, 300, 400, 501 may be formed of single unibody pieces of metal. The flashings 200, 300, 400, 501 may include an ethylene propylene diene monomer (EPDM) material or other type of rubber material that is pre-molded (e.g., pre-formed to the profile of the tile surface).

The flashings 200, 501 may include one or more tabs (not illustrated in FIGS. 2-5). The one or more tabs may be moldable to form to the profile of a portion of the tile surface. For example, the one or more tabs may be bent up to conform to a rise in the tile surface or bent down to conform to a recess in the tile surface.

FIGS. 6A-6F illustrate various views of an exemplary housing box 500 that may be implemented in the junction box 106 of FIG. 1, in accordance with at least one aspect described in the present disclosure.

With combined reference to FIGS. 6A-6F, the housing box 500 may be configured to selectively attach to the sub-tile surface. In addition, the housing box 500 may be configured to mate with the flashings 200, 300, 400, 501 of FIGS. 2A-5. The housing box 500 may include a recess portion 520 and an expose portion 522. The housing box 500 may include a first box sidewall 526a, a second box sidewall 526b, a third box sidewall 526c, a fourth box sidewall 526d, or a fifth box sidewall 526e (generally, box sidewalls 526 or box sidewall 526).

The first box sidewall 526a and the second box sidewall 526b may form a first box joint 528a. The second box sidewall 526b and the third box sidewall 526c may form a second box joint 528b. The third box sidewall 526c and the fourth box sidewall 526d may form a third box joint 528c. The fourth box sidewall 526d and the fifth box sidewall 526e may form a fourth box joint 528d. The fifth box sidewall 526e and the first box sidewall 526a may form a fifth box joint 219e. The first box joint 528a, the second box joint 528b, the third box joint 528c, the fourth box joint 528d, and the fifth box joint 528e may be generally referred to as box joints 528 or box joint 528 in the present disclosure.

The recess portion 520 may be configured such that, when the housing box 500 is installed, at least a portion of the recess portion 520 is physically positioned between a plane of the tile surface and the sub-tile surface. At least a portion of the recess portion 520 may be configured to pass through the opening 206 to be recessed within the raised portion 204, a volume between the tile surface and the plane of the sub-tile surface, or some combination thereof. The recess portion 520 may pass through the opening 206 to physically mate the sidewalls 210 with the box sidewalls 526 and the box joints 528 with the joints 219, as discussed in more detail below in relation to FIG. 7. Alternatively, the recess portion 520 may pass through the opening 206 until a first portion 542 of a bottom portion 541 physically contacts the sub-tile surface and a sealant attached to the raised portion 204, the recess portion 520, or some combination thereof may mate the sidewalls 210 with the box sidewalls 526 and the box joints 528 with the joints 219.

The expose portion 522, when the housing box 106 is mated with the flashings 200, 300, 400, 501, may extend away from the top surface 214 (e.g., the plane of the tile surface). The expose portion 522 may include indicia that indicates suitable positions for creating a hole in the expose portion 522 to permit a connector to be attached to the housing box 500. Connectors may include multiple pieces configured to attach to each other and sandwich a portion of the expose portion 522 surrounding the hole between the pieces of the connectors. The connectors may environmentally seal the hole in which the cables or wires are routed through.

The expose portion 522 may define a box opening 535. The box opening 535 may permit access to an internal volume 1005 of the housing box 500. The internal volume 1005 may be defined by the recess portion 520, the expose portion 522, a lid (e.g., a lid 709 illustrated and discussed in more detail below in relation to FIGS. 7 and 8), the box opening 535, the bottom portion 541, or some combination thereof. The box opening 535 may permit access to the internal volume 1005 to permit a user to attach the connectors to the expose portion 522 and route a cable from an external environment of the junction box 106 to the internal volume 1005.

The expose portion 522 may include a junction lip 524 that is attached to the recess portion 520 via a lip transition 531. The junction lip 524 may extend in a direction that is substantially parallel to a surface of the recess portion 520. Alternatively, the junction lip 524 extend in a direction that is not parallel (e.g., away) from the surface of the recess portion 520. The junction lip 524 and the recess portion 520 may define a junction recess 536. For example, the box sidewalls 526, the box joints 519, the junction lip 524, or some combination thereof may define the junction recess 536.

The junction lip 524 may include a mating surface 538 (illustrated in FIG. 6B). The junction recess 536 may be configured to receive at least a portion of the raised portion 204. For example, during installation of the junction box 106, the raised portion 204 may be shaped and formed so as to pass through the junction recess 536. In addition, at least a portion of the recess portion 520 is configured to pass through the opening 206. The recess portion 520 may pass through the opening and the raised portion 204 may pass through the junction recess 536 until at least a portion of the top edge 208 physically contacts the mating surface 538. The mating surface 538 may apply pressure (e.g., force) on the top edge 208 in a direction towards the sub-tile surface. For example, the mating surface 538, when the housing box 500 is installed, may continuously apply pressure on the top edge 208 to compress at least a portion of the flashings 200, 300, 400, 501 between the housing box 500 and the tile surface. In addition, when the housing box 500 is installed, the top edge 208, the sidewalls 210, or some combination thereof may apply pressure on the mating surface 538 to create a seal between the housing box 500 and the raised portion 204. Further, sealant may be attached to the mating surface 538, the top edge 208, another portion of the raised portion 204, or some combination thereof. The sealant, when the housing box 500 is installed, may be compressed between a portion of the raised portion 204 and the mating surface 538 to create the seal between the housing box 500 and the raised portion 204.

The housing box 500 may include the bottom portion 541 that includes the first surface 542. The bottom portion 541 may be attached to the recess portion 520. The first surface 542 may be configured to be physically positioned proximate the sub-tile surface. The first surface 542 may be physically positioned proximate the sub-tile surface such that a central plane 533 of the housing box 500 is not parallel to a plane 537 of the sub-tile surface. In addition, the first surface 542 may be physically positioned proximate the sub-tile surface such that the central plane 533 is substantially parallel to a plane of the tile surface. For example, when the housing box 500 is installed, the central plane 533 may be not parallel to the plane 537 of the sub-tile surface when the plane of the tile surface is not parallel to the plane 537 of the sub-tile surface.

The first surface 542 may be physically positioned proximate the sub-tile surface such that a plane 555 of the box opening 535 is substantially parallel to the plane of the tile surface. The first surface 542 may be on a plane that is not parallel to the central plane 533 and the box opening 535 may be on a plane that is parallel to the central plane 533. When the housing box 500 is installed, at least a portion of the first surface 542 may contact the sub-tile surface. Further, at least a portion of the first surface 542, when the housing box 500 is installed, may be physically positioned flush with the sub-tile surface.

Figure 6F:
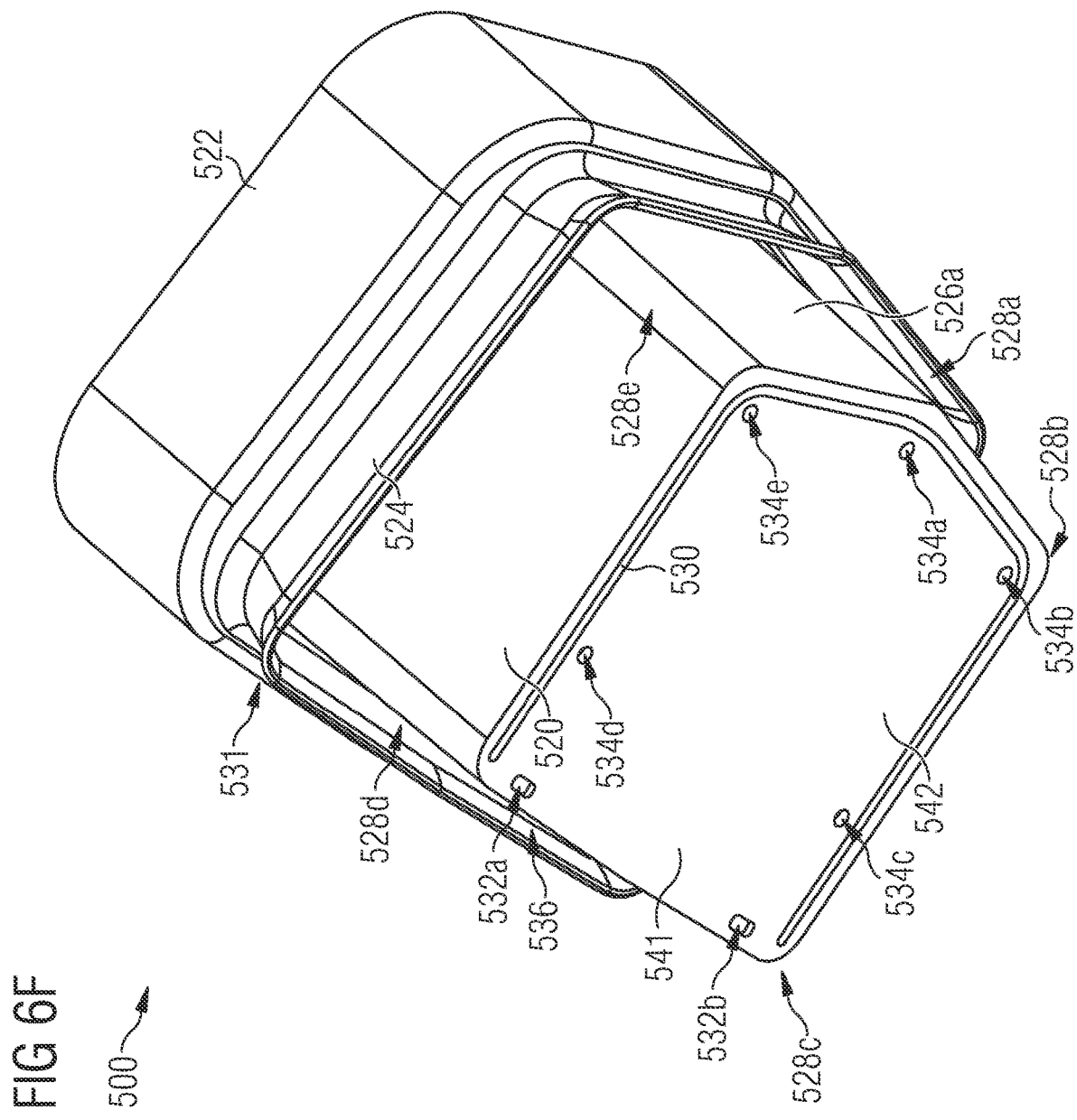
FIG. 6F illustrates another perspective view of the exemplary housing box that may be implemented in the junction box of FIG. 1.

The housing box 500 may include a standoff surface 1001 (illustrated in FIGS. 6C and 6E). A portion of the expose portion 522 may extend beyond the recess portion 520 (e.g., the expose portion 522 may include a wider profile than the recess portion 520) to form the standoff surface 1001. The standoff surface 1001 may permit a rail device (not illustrated in FIGS. 6A-6F) to be attached to the housing box 500. The rail device, when installed, may be physically positioned proximate the standoff surface 1001 and to extend across the internal volume 1005.

The housing box 500 may also include a first upper boss 575a, a second upper boss 575b, a third upper boss 575c, and a fourth upper boss 575d (generally upper bosses 575 or upper boss 575) (illustrated in FIGS. 6C and 6F). The upper bosses 575 may be attached to the standoff surface 1001. The upper bosses 575 may permit the rail device to be attached to the housing 500 (e.g., the standoff surface 1001).

The standoff surface 1001, the upper bosses 575, or some combination thereof may permit a din rail, terminal blocks, fuses, switches, breakers, ground bars, neutral bars, or any other appropriate device to be mounted to the housing box 500 within the internal volume 1005.

The housing box 500 may include a first lower boss 543a, a second lower boss 543b, a third lower boss 543c, a fourth lower boss 543d, and a first lower boss 543e (generally, lower bosses 543 or lower boss 543) (illustrated in FIGS. 6C and 6E). The lower bosses 543 may be attached to the bottom portion 541 and may define boss holes 534a-e (generally, boss holes 534 or boss hole 534). The boss holes 534 may permit a din rail and/or terminal blocks to be attached to the bottom portion 541 without having to use a self-tap fastener. The boss holes 534 may include a raised portion to accept a fastener to attach the housing box 500 to the sub-tile surface. The boss holes 534 may be omitted and the lower bosses 543 may define a recess for receiving fasteners.

The housing box 500 may be configured to be attached to the sub-tile surface using attachment devices, sealant physically attached on the first surface 542, adhesive materials, or some combination thereof. For example, the housing box 500 may be attached to the sub-tile surface using two or more screws and the sealant to attach the housing box 500 to a sheathing material or a plywood material or a rafter. The first surface 542 may be configured to be physically positioned proximate the sub-tile surface so as to cause the sealant to prevent moisture from entering between the first surface 542 and the sub-tile surface. In addition, the lower boss holes 534 may permit the attachment devices to attach the junction box 106 (e.g., the housing box 500) to the sub-tile surface. The lower boss holes 534 may be positioned proximate the first groove 530 to prevent the attachment devices from being positioned between the first groove 530 and the edges of the housing box 500 (e.g., between the sealant and the edges of the housing box 500). The attachment devices may apply a force on the housing box 500 in a direction towards the sub-tile surface to create a compression seal between the sub-tile surface and the housing box 500 using the sealant.

The first surface 542 may define a first groove 530 (e.g., illustrated in FIGS. 6A, 6B, and 6F). A size and a position of the first groove 530 may correspond to a size and/or a position of a second groove 540 (e.g., illustrated in FIGS. 6C and 6E). The first groove 530 may indicate suitable placement of the sealant or other suitable adhesive materials on the first surface 542. Suitable placement of the sealant may be between the first groove 530 and the edges of the housing box 500. The suitable placement may prevent a user from placing a hole in the bottom portion 541 of the housing box 500 that corresponds to where the sealant may be placed. In some embodiments, the lower boss holes 534 may be positioned proximate the first groove 530 to maximize an area within the second groove 540 for placing holes or fasteners and to prevent any holes being placed in the bottom portion 541 that correspond to placement of sealant.

The bottom portion 541 may define a first weep hole 532a and a second weep hole 532b (generally, weep holes 532 or weep hole 532). The weep holes 532 may be configured to permit fluid that is positioned within the internal volume 1005 to exit the internal volume 1005. The weep holes 532 may be omitted or the bottom portion 541 may define a different number of weep holes 532. The bottom portion 541 may define multiple weep holes at different locations. For example, the bottom portion 541 may define one weep hole positioned proximate the fifth box sidewall 526e and an additional weep hole positioned proximate the third box sidewall 526c.

FIG. 7 illustrates the exemplary housing box 500 mating to the exemplary flashing of 501 FIG. 5 and the exemplary lid 709 to form the junction box 106 of FIG. 1, in accordance with at least one aspect described in the present disclosure. The housing box 500 is illustrated as mating with the flashing 501 of FIG. 5 for illustrative purposes. The housing box 500 may be configured to mate with each of the flashings 200, 300, 400, 501 illustrated in FIGS. 2-5. Discussion of the housing box 500, the flashing 501, and the lid 709 in relation to FIG. 7 may correspond to the housing box 500 mating to the exemplary flashing of 501 and the exemplary lid 709 (e.g., installation of the junction box 106).

The flashing 501 may interface with the housing box 500 such that when the junction box 106 is installed, the flashing 501 is compressed between the housing box 500 and a portion of the tile surface. The housing box 500 may move relative to the flashing 501 in the direction indicated by arrow 605. The recess portion 520 may pass through the opening 206 until the junction lip 524 contacts the top surface 214, the top edge 208 contacts the mating surface 538, or some combination thereof. In addition, at least a portion of the raised portion 204 may pass through the junction recess 536 (e.g., the junction recess 536 may receive at least a portion of the raised portion 204) until the junction lip 524 contacts the top surface 214, the top edge 208 contacts the mating surface 538, or some combination thereof. The junction lip 524 may contact the top surface 214, the top edge 208 may contact the mating surface 538, or some combination thereof to cause a force to be applied on the flashing 501 in a direction towards the sub-tile surface.

The recess portion 520 may pass through the opening 206 to physically mate the sidewalls 210 with the box sidewalls 526. For example, the top edge 208 and at least a portion of the sidewalls 210 may be positioned between the junction lip 524 and the recess portion 520. In addition, the recess portion 520 may be recessed within the box sidewalls 210 of the flashing 501. The expose portion 522 may extend away from the flashing 501 and the tile surface and may be exposed to an external environment.

During installation, the first surface 542 may be physically positioned proximate the sub-tile surface so as to cause sealant attached to the first surface 542 to prevent moisture from entering between the first surface 542 and the sub-tile surface.

The lid 709 may move relative to the housing box 500 in the direction indicated by arrow 607. The lid 709 may selectively attach to the housing box 500 to environmentally seal the internal volume 1005. The lid 709 may selectively attach to the housing box 500 using attachment devices, sealant, adhesive material, or any other appropriate material or device.

The housing box 500 may include brass inserts configured to connect to fasten to selectively attach the lid 709 to the housing box 500. Alternatively, the housing box 500 may include metal screws to selectively attach the lid 709 to the housing box 500. The junction box 106 may include plastic to plastic connections to selectively attach the lid 709 to the housing box 500. The junction box 106 may include plastic to metal connections to selectively attach the lid 709 to the housing box 500. The junction box 106 may include captive screws, captive bolts, or some combination thereof to selectively attach the lid 709 to the housing box 500.

The housing box 500; the flashings 200, 300, 400, 501; and the lid 709 may include a non-conductive material. In some embodiments, the housing box 500; the flashings 200, 300, 400, 501; and the lid 709 may include a plastic material, a polycarbonate material, a PVC material, an acrylonitrile butadiene styrene (ABS) material, acrylonitrile styrene and polycarbonate blend (ASA+PC) material, a polycarbonate and ABS blend (PC+ABS) material, or any other appropriate non-conductive material. In these and other embodiments, the housing box 500; the flashings 200, 300, 400, 501; and the lid 709 may be infused with a non-conductive UV resistant material. For example, the housing box 500; the flashings 200, 300, 400, 501; and the lid 709 may be infused with a low molecular weight hydroxyphenyl-benzotriazole material, a high molecular weight hydroxyphenyl-benzotriazole material, or any other appropriate non-conductive UV resistant material. The housing box 500; the flashings 200, 300, 400, 501; and the lid 709 not including conductive material may limit a number of connections from the structure to the junction box 106 since the junction box 106 will not need to be independently grounded. Alternatively, in some embodiments, one or more of the housing box 500; the flashings 200, 300, 400, 501; and the lid 709 may include a metallic material. For example, the housing box 500 and the lid 709 may include a non-conductive material and the flashings 200, 300, 400, 501 may include a metallic material.

In some embodiments, a shape of the housing box 500; the flashings 200, 300, 400, 501; the lid 709 or some combination thereof may be reconfigurable. For example, the shape of the housing box 500 and the opening 206 may be reconfigurable between a circle, a square, rectangle, pentagon, or any other appropriate shape.

In some embodiments, the housing box 500 may include a peel and stick material on at least a portion of the first surface 542. The peel and stick material may include an adhesive material configured to temporarily or permanently adhere the housing box 500 to the sub-tile surface, the tile surface, or some combination thereof.

In some embodiments, the flashing 501 may include a peel and stick material on at least a portion of a surface of the sidewalls 210. In addition, the flashing 501 may include a peel and stick material on at least a portion of the top surface 214, the bottom surface 216, or some combination thereof. The peel and stick material may include an adhesive material to adhere the housing box 500 to the flashing 501 and/or create a water tight seal between the housing box 500 and the flashing 501.

FIG. 8 illustrates a cross sectional view of the exemplary junction box 106 of FIG. 1, in accordance with at least one aspect described in the present disclosure. The junction box 106 may include a flashing 703a-b (generally, flashing 703). The flashing 700a-b may correspond to any of the flashings 200, 300, 400, 501 of FIGS. 2-5.

The junction box 106 may include the lid 709 and the housing box 500. As illustrated in FIG. 7, at least a portion of the raised portion 204 may be positioned within the junction recess 536. The junction lip 524 may form a skirt that operates as a drip edge to the flashing 703. Sealant or other adhesive material (not illustrated in FIG. 8) may also be positioned within the junction lip 524 to adhere the housing box 500 to the flashing 703 when the raised portion 204 is physically positioned within the junction recess 536.

In some embodiments, the flashing 703 may be attached to the housing box 500 using a snap in connection. In other embodiments, the flashing may be attached to the housing box 500, using rivet connectors.

The junction box 106 may also include foam (not illustrated in FIG. 8). The foam may be placed between a plane 701 of the sub-tile surface, a portion of the housing box 500 (e.g., a portion of the recess portion 520), and a portion of the flashing 703. The foam may be placed in a cavity 713 defined by the plane 701 of the sub-tile surface, the housing box 500, and the flashing 703. The foam may form a compression water seal between housing box 500, the flashing 703, and the exterior surface 701.

FIG. 9 illustrates a sectional view of the exemplary housing box 500 including a protrusion 599, in accordance with at least one aspect described in the present disclosure. The protrusion 599 may be attached to the recess portion 520 and the junction lip 524. The protrusion 599 may extend a portion of the junction recess 536. Alternatively, the protrusion 599 may extend an entire length of the junction recess 536.

The protrusion 599 may extend from the recess portion 520 and junction lip 534 at an angle that is not perpendicular and not parallel to relative to the surface of the box sidewalls 510. The protrusion 599, when the flashings 200, 300, 400, 501 are attached to the housing box 500, may create tension between the flashings 200, 300, 400, 501 and the housing box 500. The tension may prevent the housing box 500 from moving relative the flashings 200, 300, 400, 501 when installed and may align the flashings 200, 300, 400, 501 with the housing box 500. For example, during or after installation, the housing box 500 may be exposed to winds in a direction away from the tile surface and the protruded portions 599 may prevent the housing box 500 from moving.

Figure 10:
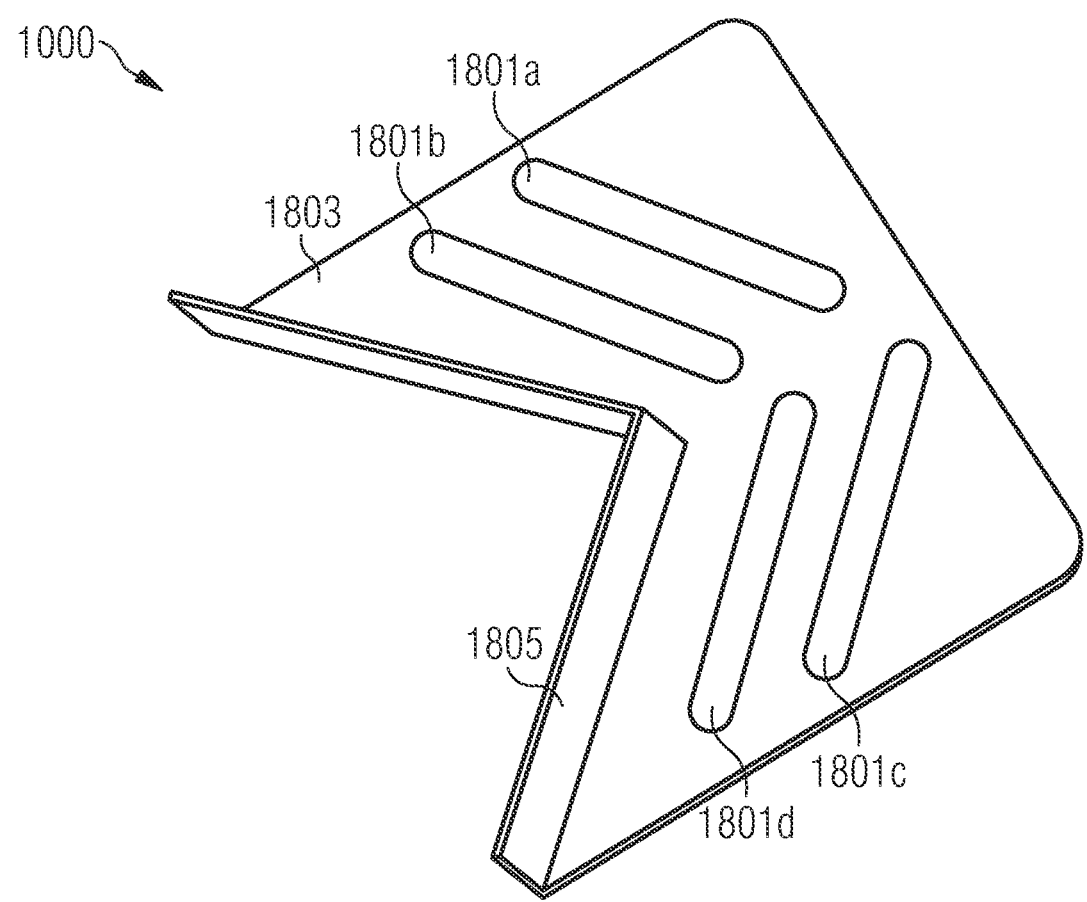
FIG. 10 illustrates an exemplary mini flashing (e.g., a sub-flashing) that may be implemented in the junction box of FIG. 1.

FIG. 10 illustrates an exemplary mini flashing (e.g., a sub-flashing) 1000 that may be implemented in the junction box 106 of FIG. 1, in accordance with at least one aspect described in the present disclosure. In some embodiments, the mini flashing 1000 may be installed on the tile surface upstream of the junction box 106. The mini flashing 1000 may be configured to divert fluid away from the junction box 106 before the fluid reaches the first edge 217 or the recess portion 520.

The mini flashing 1000 may include one or more fluid diverter channels or devices 1801a-d on a surface 1803 of the mini flashing 1000. When the mini flashing 1000 is installed, the fluid diverter channels or devices 1801a-d may be physically positioned upstream of the junction box 106. The fluid diverter channels or devices 1801a-d may divert fluid away from the junction box 106 before the fluid reaches the sidewalls 210. The fluid diverter channels or devices 1801a-c may include a V shape, a semi-circular shape, or any other appropriate shape.

The mini flashing 1000 may include a flashing lip 1805. When the mini flashing 1000 is installed, the flashing lip 1805 may be physically positioned proximate the junction lip 524, the sidewalls 210, or some combination thereof. The flashing lip 1805 may divert fluid away from the junction box 106 before the fluid reaches the sidewalls 210.

FIG. 11 illustrates a cross sectional view of the exemplary junction box 106 of FIG. 1 in an installed configuration, in accordance with at least one aspect described in the present disclosure. The junction box 106 may include the housing box 500, the flashing 501 and the lid 709. The housing box 500 is illustrated as mating with the flashing 501 of FIG. 5 for illustrative purposes. The housing box 500 may be configured to mate with each of the flashings 200, 300, 400, 501 illustrated in FIGS. 2-5 based on which type of tiles 1109a-e (generally tiles 1109) are implemented as a tile surface 1103.

As illustrated in FIG. 11, the tiles 1109 may be attached to a sub-tile surface 1101 in rows, columns, or some combination thereof. The tiles 1109e may form the tile surface 1103. The flashing 501 may replace one of the tiles 1109 and form a portion of the tile surface 1103. In addition, the flashing 501 may be formed to the profile of the tile surface 1103. For example, a portion 1111 of the flashing 501 may be bent at an angle to form to a step profile in the tile surface 1103. In addition, a portion of the flashing 501 may be physically positioned between the sub-tile surface 1101 and a neighboring tile 1109a. Further, a portion of the flashing 501 may overlap or be positioned proximate another neighboring tile 1109c. Likewise, yet another portion of the flashing 501 may be position above a neighboring tile 1109d to form a portion of the tile surface 1103 and position the neighboring tile 1009d between the flashing 501 and the sub-tile surface 1101.

A portion of the recess portion 520 may be positioned between the flashing 501 and the sub-tile surface 1101. In addition, a portion of the raised portion 204 may be positioned within the junction recess 536. During installation, the recess portion 520 may pass through the opening 206 (not illustrated in FIG. 11) to physically mate the bottom portion 541 (e.g., the first surface 542 not illustrated in FIG. 11) with the sub-tile surface 1101. The expose portion 522 may extend away from the flashing 501 and the tile surface 1103. The expose portion 522 may be exposed to an external environment. Attachment devices 1107 may pass through the boss holes 534 (not illustrated in FIG. 11) defined by the lower bosses 543 and attach the housing box 500 to the sub-tile surface 1101. A single attachment device 1107 and a single lower boss are numbered in FIG. 11 for ease of illustration.

When installed, the plane 537 of the sub-tile surface 1101 may be not parallel to the central plane 533. For example, the difference between the angle of the plane 537 of the sub-tile surface 1101 and the angle of the central plane 533 may be between 0.1 degrees and fifteen degrees. The plane 537 of the sub-tile surface 1101 is illustrated in FIG. 11 slightly offset from a cross-section portion of the sub-tile surface 1101 for ease of illustration.

The lid 709 may selectively attach to the housing box 500 to environmentally seal the internal volume 1005. The junction box 106 may also include foam (not illustrated in FIG. 11). The foam may be placed between the plane 537 of the sub-tile surface 1101, a portion of the housing box 500 (e.g., a portion of the recess portion 520), and a portion of the flashing 501. The foam may be placed in a cavity 713 defined by the plane 537 of the sub-tile surface 1101, the housing box 500, and the flashing 501.

The junction box 106 may include din rails 1105a-b. The din rails 1105a-b may be attached to the housing box 500 via the upper bosses 575. For example, a first din rail 1105a may be attached to the housing box via the first upper boss 575a and the fourth upper boss 575d. A second din rail 1105b may extend across the internal volume 1005.

The present disclosure is not to be limited in terms of the particular embodiments described in the present disclosure, which are intended as illustrations of various aspects. Many modifications and variations can be made without departing from its spirit and scope, as will be apparent to those skilled in the art. Functionally equivalent methods and apparatuses within the scope of the present disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that the present disclosure is not limited to particular methods, reagents, compounds, compositions, or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from the scope of the present embodiment. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A junction box comprising:
    a flashing configured to be physically positioned proximate a tile surface of a structure, the flashing comprising a raised portion that comprises a top edge and the raised portion defines an opening; and
    a housing box configured to selectively attach to a sub-tile surface of the structure, the housing box comprising:
        a recess portion;
        an expose portion comprising a junction lip attached to the recess portion, the junction lip comprising a mating surface, the junction lip and the recess portion define a junction recess, and at least a portion of the recess portion is configured to pass through the opening until at least a portion of the top edge physically contacts the mating surface to apply a force on the flashing in a direction towards the sub-tile surface; and
        a bottom portion attached to the recess portion, the bottom portion comprising a first surface configured to be physically positioned proximate the sub-tile surface such that a central plane of the housing box is not parallel to a plane of the sub-tile surface.

2. The junction box of claim 1, wherein:
    the housing box is configured to attach to the sub-tile surface using sealant physically positioned on the first surface; and
    the first surface is configured to be physically positioned proximate the sub-tile surface so as to cause the sealant to prevent moisture from entering between the first surface and the sub-tile surface.

3. The junction box of claim 2, wherein the first surface is configured to be physically positioned proximate the sub-tile surface such that at least a portion of the first surface is physically positioned flush with the sub-tile surface.

4. The junction box of claim 2, wherein the flashing:
    comprises a bottom surface; and
    is configured to be physically positioned proximate the tile surface such that at least a portion of the bottom surface is flush with a portion of the tile surface.

5. The junction box of claim 1, wherein the bottom portion is configured such that a plane of the first surface is parallel to a plane of the sub-tile surface and not parallel to a plane of the tile surface when the plane of the tile surface is not parallel to the plane of the sub-tile surface.

6. The junction box of claim 1, wherein:
    the raised portion comprises a plurality of sidewalls;
    the recess portion comprises a plurality of box sidewalls; and
    the at least the portion of the recess portion is configured to pass through the opening to physically mate the sidewalls with the box sidewalls.

7. The junction box of claim 1, wherein the junction recess is configured to receive at least a portion of the raised portion.

8. The junction box of claim 1, wherein the expose portion comprises indicia that indicates suitable positions for creating a hole in the expose portion to permit a connector to be attached to the housing box.

9. The junction box of claim 1, wherein the expose portion defines a box opening that permits access to an internal volume of the housing box to attach a connector to the housing box and route a cable from an external environment of the housing box to the internal volume.

10. The junction box of claim 1, wherein the junction lip extends away from a surface of the recess portion to define the junction recess.

11. The junction box of claim 1, wherein the housing box further comprises a standoff surface configured to permit a rail device to be physically positioned proximate the standoff surface and to extend across an internal volume of the housing box.

12. The junction box of claim 11, wherein the housing box further comprises:
    a standoff surface; and
    a plurality of bosses attached to the standoff surface, wherein the plurality of bosses are configured to permit a rail device to be attached to the housing box.

13. The junction box of claim 1 further comprising a lid selectively attachable to the housing box to environmentally seal an internal volume of the housing box and wherein the flashing further comprises a support lip attached to an edge of the flashing, wherein the support lip is configured to at least temporarily mate with the tile surface to prevent the flashing from moving relative the tile surface during installation of the housing box.

14. A junction box comprising:
    a housing box configured to selectively attach to a sub-tile surface of a structure, the housing box comprising:
        a recess portion configured to be physically positioned between a plane of a tile surface of the structure and the sub-tile surface;
        an expose portion configured to extend away from the plane of the tile surface; and a bottom portion attached to the recess portion, the bottom portion comprising a first surface configured to be physically positioned proximate the sub-tile surface such that a central plane of the housing box is not parallel to a plane of the sub-tile surface when the plane of the tile surface is not parallel to the plane of the sub-tile surface.

15. The junction box of claim 14, further comprising a flashing configured to be physically positioned proximate the tile surface, the flashing comprising a raised portion that comprises a top edge and the raised portion defines an opening, wherein the expose portion comprises a junction lip attached to the recess portion, the junction lip comprising a mating surface, the junction lip and the recess portion define a junction recess, and at least a portion of the recess portion is configured to pass through the opening until the top edge physically contacts at least a portion of the mating surface to apply a force on the flashing in a direction towards the sub-tile surface.

16. The junction box of claim 15, wherein the flashing:
   comprises a bottom surface; and
   is configured to be physically positioned proximate the tile surface such that at least a portion of the bottom surface is flush with a portion of the tile surface.

17. The junction box of claim 14, wherein the expose portion defines a box opening that permits access to an internal volume of the housing box to attach a connector to the housing box and route a cable from an external environment of the housing box to the internal volume.

18. The junction box of claim 15 further comprising a lid selectively attachable to the housing box to environmentally seal an internal volume of the housing box and wherein the flashing further comprises a support lip attached to an edge of the flashing, wherein the support lip is configured to at least temporarily mate with the tile surface to prevent the flashing from moving relative the tile surface during installation of the housing box.

19. A junction box comprising:
   a flashing configured to be physically positioned proximate a tile surface of a structure, the flashing comprising a raised portion that comprises a top edge and the raised portion defines an opening; and
   a housing box configured to selectively attach to a sub-tile surface of the structure, the housing box comprising:
      a recess portion;
      an expose portion comprising a junction lip attached to the recess portion, the junction lip comprising a mating surface, the junction lip and the recess portion define a junction recess, and at least a portion of the recess portion is configured to pass through the opening until at least a portion of the top edge physically contacts the mating surface to apply a force on the flashing in a direction towards the sub-tile surface; and
      a bottom portion attached to the recess portion, the bottom portion comprising a first surface configured to be physically positioned proximate the sub-tile surface such that:
         a central plane of the housing box is not parallel to a plane of the sub-tile surface when a plane of the tile surface is not parallel to the plane of the sub-tile surface; and
         at least a portion of the first surface is flush with a portion of the sub-tile surface.

20. The junction box of claim 19, further comprising a lid selectively attachable to the housing box to environmentally seal an internal volume of the housing box and wherein:
   the housing box further comprises:
      a standoff surface; and
      a plurality of bosses attached to the standoff surface, wherein the plurality of bosses are configured to permit a rail device to be attached to the housing box;
   the expose portion comprises indicia that indicates suitable positions for creating a hole in the expose portion to permit a connector to be attached to the housing box;
   the junction recess is configured to receive at least a portion of the raised portion;
   the raised portion comprises a plurality of sidewalls;
   the recess portion comprises a plurality of box sidewalls; and
   the at least the portion of the recess portion is configured to pass through the opening to physically mate the sidewalls with the box sidewalls.

* * * * *